United States Patent
Fei et al.

(10) Patent No.: US 12,177,328 B2
(45) Date of Patent: Dec. 24, 2024

(54) METHODS AND SYSTEMS FOR PROTECTING AGAINST MEMORY-BASED SIDE-CHANNEL ATTACKS

(71) Applicant: Northeastern University, Boston, MA (US)

(72) Inventors: Yunsi Fei, Needham, MA (US); Zhen Jiang, Tampa, FL (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 227 days.

(21) Appl. No.: 17/723,711

(22) Filed: Apr. 19, 2022

(65) Prior Publication Data

US 2022/0368514 A1    Nov. 17, 2022

Related U.S. Application Data

(60) Provisional application No. 63/178,023, filed on Apr. 22, 2021.

(51) Int. Cl.
*H04L 9/00* (2022.01)
(52) U.S. Cl.
CPC ................... *H04L 9/005* (2013.01)
(58) Field of Classification Search
CPC ............... H04L 9/005; H04L 9/002
See application file for complete search history.

(56) References Cited

U.S. PATENT DOCUMENTS

| | | | | |
|---|---|---|---|---|
| 8,996,814 | B2* | 3/2015 | Peinado | G06F 12/145 711/159 |
| 2006/0104443 | A1* | 5/2006 | Chari | H04L 9/0662 380/46 |
| 2009/0077307 | A1* | 3/2009 | Kaburlasos | G06F 12/0292 711/E12.002 |
| 2012/0207298 | A1* | 8/2012 | Meyer | G06F 7/725 380/28 |

(Continued)

OTHER PUBLICATIONS

Biham, E., "A fast new DES implementation in software." International Workshop on Fast Software Encryption. Springer, Berlin, Heidelberg, 1997.

(Continued)

*Primary Examiner* — Saleh Najjar
*Assistant Examiner* — Devin E Almeida
(74) *Attorney, Agent, or Firm* — Hamilton, Brook, Smith & Reynolds, P.C.

(57) ABSTRACT

Embodiments protect against memory-based side-channel attacks by efficiently shuffling data. In an example implementation, in response to a data access request by an encryption methodology regarding a first data element from amongst a plurality of data elements stored in memory, a storage address of a second data element of the plurality is determined. This storage address is determined using (i) an address of the first data element in the memory, (ii) a permutation function, and (iii) a random number. In turn, the first data element is stored at the determined storage address of the second data element and the second data element is (Continued)

stored at the address of the first data element. In this way, embodiments protect encryption methodologies from memory-based side-channel attacks.

19 Claims, 14 Drawing Sheets
(3 of 14 Drawing Sheet(s) Filed in Color)

(56) References Cited

U.S. PATENT DOCUMENTS

| | | | | |
|---|---|---|---|---|
| 2012/0324141 | A1* | 12/2012 | Seong | G06F 12/0238 |
| | | | | 711/3 |
| 2019/0155746 | A1* | 5/2019 | Bhatia | G06F 12/0246 |
| 2021/0194689 | A1* | 6/2021 | Susella | H04L 9/14 |
| 2022/0075879 | A1* | 3/2022 | Hamburg | G06F 21/602 |
| 2023/0059273 | A1* | 2/2023 | Wang | G06F 9/45558 |

OTHER PUBLICATIONS

Bonneau, J. et al., "Cache-collision timing attacks against AES." International Workshop on Cryptographic Hardware and Embedded Systems. Springer, Berlin, Heidelberg, 2006.
Chen, S., et al. "Leveraging hardware transactional memory for cache side-channel defenses." Proceedings of the 2018 on Asia Conference on Computer and Communications Security. 2018.
Domnitser, L., et al. "Non-monopolizable caches: Low-complexity mitigation of cache side channel attacks." ACM Transactions on Architecture and Code Optimization (TACO) 8.4 (2012): 1-21.
Goldreich, O., et al. "Software protection and simulation on oblivious RAMs." Journal of the ACM (JACM) 43.3 (1996): 431-473.
Gruss, D. et al. "Strong and Efficient Cache Side-Channel Protection using Hardware Transactional Memory." 26th USENIX Security Symposium (USENIX Security 17). 2017.
Gruss, D., et al. "Flush+ Flush: a fast and stealthy cache attack." International Conference on Detection of Intrusions and Malware, and Vulnerability Assessment. Springer, Cham, 2016.
Zhou, Z., et al. "A software approach to defeating side channels in last-level caches." Proceedings of the 2016 ACM SIGSAC Conference on Computer and Communications Security. 2016.
Gulmezoğlu, B. et al. "A faster and more realistic flush+ reload attack on AES." International Workshop on Constructive Side-Channel Analysis and Secure Design. Springer, Cham, 2015.
Irazoqui, G., et al., "S $ A: A shared cache attack that works across cores and defies VM sandboxing—and its application to AES." 2015 IEEE Symposium on Security and Privacy. IEEE, 2015.
Irazoqui, G., et al. "Wait a minute! A fast, Cross-VM attack on AES." International Workshop on Recent Advances in Intrusion Detection. Springer, Cham, 2014.
Jiang, Z., et al., "A complete key recovery timing attack on a GPU." 2016 IEEE International symposium on high performance computer architecture (HPCA). IEEE, 2016.
Jiang, Z. et al., "A novel side-channel timing attack on GPUs." Proceedings of the on Great Lakes Symposium on VLSI 2017. 2017.
Jiang, Z., et al., "A novel cache bank timing attack." 2017 IEEE/ACM International Conference on Computer-Aided Design (ICCAD). IEEE, 2017.
Kadam, G., et al., "Rcoal: mitigating gpu timing attack via subwarp-based randomized coalescing techniques." 2018 IEEE International Symposium on High Performance Computer Architecture (HPCA). IEEE, 2018.
Karimi, E., et al. "A timing side-channel attack on a mobile gpu." 2018 IEEE 36th International Conference on Computer Design (ICCD). IEEE, 2018.
Kim, Taesoo, Marcus Peinado, and Gloria Mainar-Ruiz. "STEALTHMEM: System-Level Protection Against Cache-Based Side Channel Attacks in the Cloud." 21st USENIX Security Symposium (USENIX Security 12). 2012.
Liu, F., et al. "Catalyst: Defeating last-level cache side channel attacks in cloud computing." 2016 IEEE international symposium on high performance computer architecture (HPCA). IEEE, 2016.
Liu, F., et al.. "Random fill cache architecture." 2014 47th Annual IEEE/ACM International Symposium on Microarchitecture. IEEE, 2014.
Liu, F., et al. "Newcache: Secure cache architecture thwarting cache side-channel attacks." IEEE Micro 36.5 (2016).
Liu, F., et al. "Last-level cache side-channel attacks are practical." 2015 IEEE symposium on security and privacy. IEEE, 2015.
Maas, M., et al. "Phantom: Practical oblivious computation in a secure processor." Proceedings of the 2013 ACM SIGSAC conference on Computer & communications security. 2013.
Raj, H., et al. "Resource management for isolation enhanced cloud services." Proceedings of the 2009 ACM workshop on Cloud computing security. 2009.
Rane, A. et al., "Raccoon: Closing Digital Side-Channels through Obfuscated Execution." 24th USENIX Security Symposium (USENIX Security 15). 2015.
Stefanov, E., et al. "Path ORAM: an extremely simple oblivious RAM protocol." Journal of the Acm (JACM) 65.4 (2018): 1-26.
Tromer, E., et al. "Efficient cache attacks on AES, and countermeasures." Journal of Cryptology 23.1 (2010): 37-71.
Wang, Z., et al., "New cache designs for thwarting software cache-based side channel attacks." Proceedings of the 34th annual international symposium on Computer architecture. 2007.
Yarom, Y., et al. "Flush+ Reload: A High Resolution, Low Noise, L3 Cache Side-Channel Attack." 23rd USENIX security symposium (USENIX security 14). 2014.
Yarom, Y., et al. "CacheBleed: a timing attack on OpenSSL constant-time RSA." Journal of Cryptographic Engineering 7.2 (2017): 99-112.

* cited by examiner

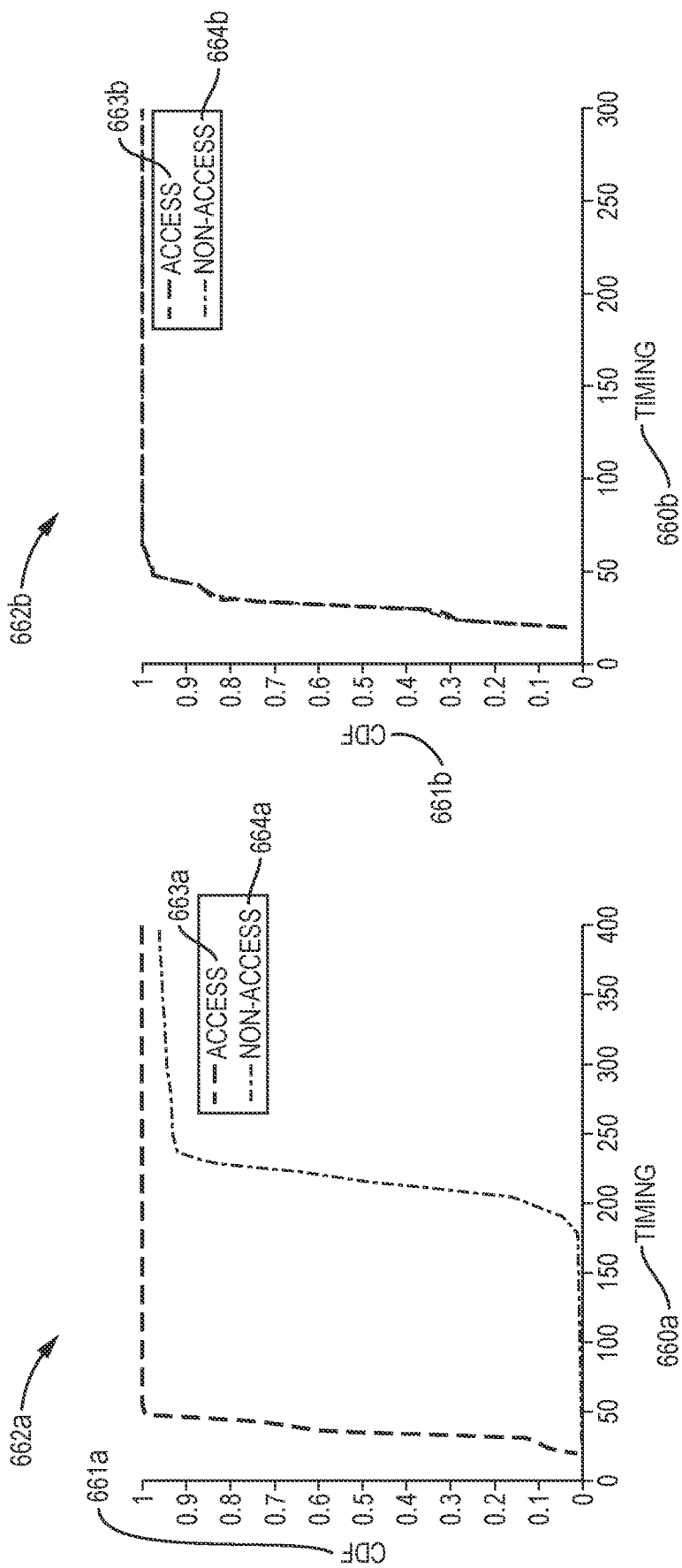

METHODS AND SYSTEMS FOR PROTECTING AGAINST MEMORY-BASED SIDE-CHANNEL ATTACKS

RELATED APPLICATION

This application claims the benefit of U.S. Provisional Application No. 63/178,023, filed on Apr. 22, 2021. The entire teachings of the above Application are incorporated herein by reference.

GOVERNMENT SUPPORT

This invention was made with government support under Grant No. 1563697 awarded by the National Science Foundation. The government has certain rights in the invention.

BACKGROUND

Recent years have seen various side-channel timing attacks demonstrated on both central processing units (CPUs) and graphics processing units (GPUs), in diverse settings such as desktops, clouds, and mobile systems. These attacks observe events on different shared resources on the memory hierarchy from timing information. From these observed events, secret-dependent memory access patterns are inferred and a secret, e.g., key, is retrieved through statistical analysis. Such attacks are generally referred to herein as memory-based side-channel attacks.

SUMMARY

While methodologies exist to protect against memory-base side-channel attacks, these existing approaches are inefficient and inadequate. As such, improved functionality to protect against memory-based side-channel attacks is needed.

Embodiments, which may be referred to herein as MemPoline, provide a novel software countermeasure against memory-based side-channel attacks. Embodiments hide the secret dependent memory access pattern by moving sensitive data around randomly within a memory space. Compared to the prior oblivious random access memory (ORAM) technology, embodiments employ parameter-directed permutations to achieve randomness, which are significantly more efficient and yet provide similar security. Advantageously, embodiments can be implemented by only modifying the source code, and are general—algorithm-agnostic, portable—independent of the underlying architecture, and compatible—a user-space approach that works for any operating system or hypervisor.

Amongst others, embodiments can be applied to both Advanced Encryption Standard (AES) and RSA, the most commonly used symmetric cipher and asymmetric cipher for data security, respectively, where the abbreviation RSA stands for the creators of the technique, Rivest, Shamir, and Adelman of RSA Data Security. Security evaluation results show that embodiments resist a series of existing memory-based side-channel attacks on CPUs and GPUs.

Embodiments provide a software approach to resist memory-based side-channel attacks without requiring any hardware modifications. The permutation-based random data shuffling implemented by embodiments is significantly more efficient than prior randomization methods and still provides adequate security. Embodiments are a general countermeasure against many known memory-based side-channel attacks. Further, embodiments can be implemented with application programming interfaces (APIs) to apply to multiple ciphers across different platforms (CPUs and GPUs).

One such embodiment is directed to a method for protecting against memory-based side-channel attacks. The method begins in response to a data access request by an encryption methodology regarding a first data element from amongst a plurality of data elements stored in memory. A storage address of a second data element of the plurality is then determined using (i) an address of the first data element in the memory, (ii) a permutation function, and (iii) a random number. In turn, the first data element is stored at the determined storage address of the second data element and the second data element is stored at the address of the first data element. This shuffling protects the encryption methodology from memory-based side-channel attacks.

Embodiments may also service the request by providing the first data element to the encryption methodology. In an embodiment, the first data element is provided to the encryption methodology if the request is a read request. In one such embodiment, the data element is provided to the encryption methodology before storing the first data element in the memory with a permuted address.

Embodiments may use any permutation function known to those of skill in the art. According to an example embodiment, the permutation function is an exclusive or (XOR) function.

Another embodiment tracks update status for each of the plurality of data elements. According to such an embodiment, update status is associated with storage addresses of the plurality of data elements. In an embodiment the tracking includes creating a bit-map wherein each of the plurality of data elements has an associated one-bit indicator of permutation status.

In an alternative embodiment, the random number is a second random number and the method further comprises, prior to receipt of the request, storing each of the plurality of data elements at random locations in the memory. In such an embodiment each random location is a function of a first random number. Such an embodiment may further include specifying a region in the memory, wherein the random locations are in the specified region in the memory.

Another embodiment iterates the determining and storing for each of a plurality of requests. In such an embodiment, in at least one given iteration, the random number is modified. Such an embodiment may select the at least one given iteration, in which to modify the random number, as a function of the encryption methodology.

Embodiments may also store each of the plurality of data elements at addresses determined using (i) the data elements address, (ii) the permutation function, and (iii) the random number. Such an embodiment can update the random number. According to an embodiment, the epoch length is preset and is a function of a number of requests to access the plurality of data elements.

Another embodiment specifies a safe region in the memory and loads each of the plurality of data elements to addresses in the specified region. In an example embodiment the addresses in the specified region are a function of an initial random number.

In yet another embodiment, the random number is a first random number and each of the plurality of data elements is stored at an address that is a function of the first random number or a second random number. In such an embodiment, at any time during the execution of the encryption methodology, there are two random numbers associated with the sensitive data structure, and each element is in one of two states specified by one of the two random numbers. According to an embodiment, size and range of the first random number and the second random number is determined by a platform microarchitecture, cache structure, and function of the encryption methodology.

Another embodiment is directed to a computer system for protecting against memory-based side-channel attacks. The computer system includes a processor and a memory with computer code instructions stored thereon. In such an embodiment, the processor and the memory, with the computer code instructions, are configured to cause the system to protect against memory-based side-channel attacks according to any embodiment described herein.

Yet another embodiment is directed to a computer program product for protecting against memory-based side-channel attacks. The computer program product comprises one or more non-transitory computer-readable storage devices and program instructions stored on at least one of the one or more storage devices. The program instructions, when loaded and executed by a processor, cause an apparatus associated with the processor to protect against memory-based side-channel attacks as described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 6A is a plot depicting information leakage in an unprotected encryption methodology.

FIG. 6B is a plot depicting information leakage in an encryption methodology protected by an embodiment.

DETAILED DESCRIPTION

Figure 1:
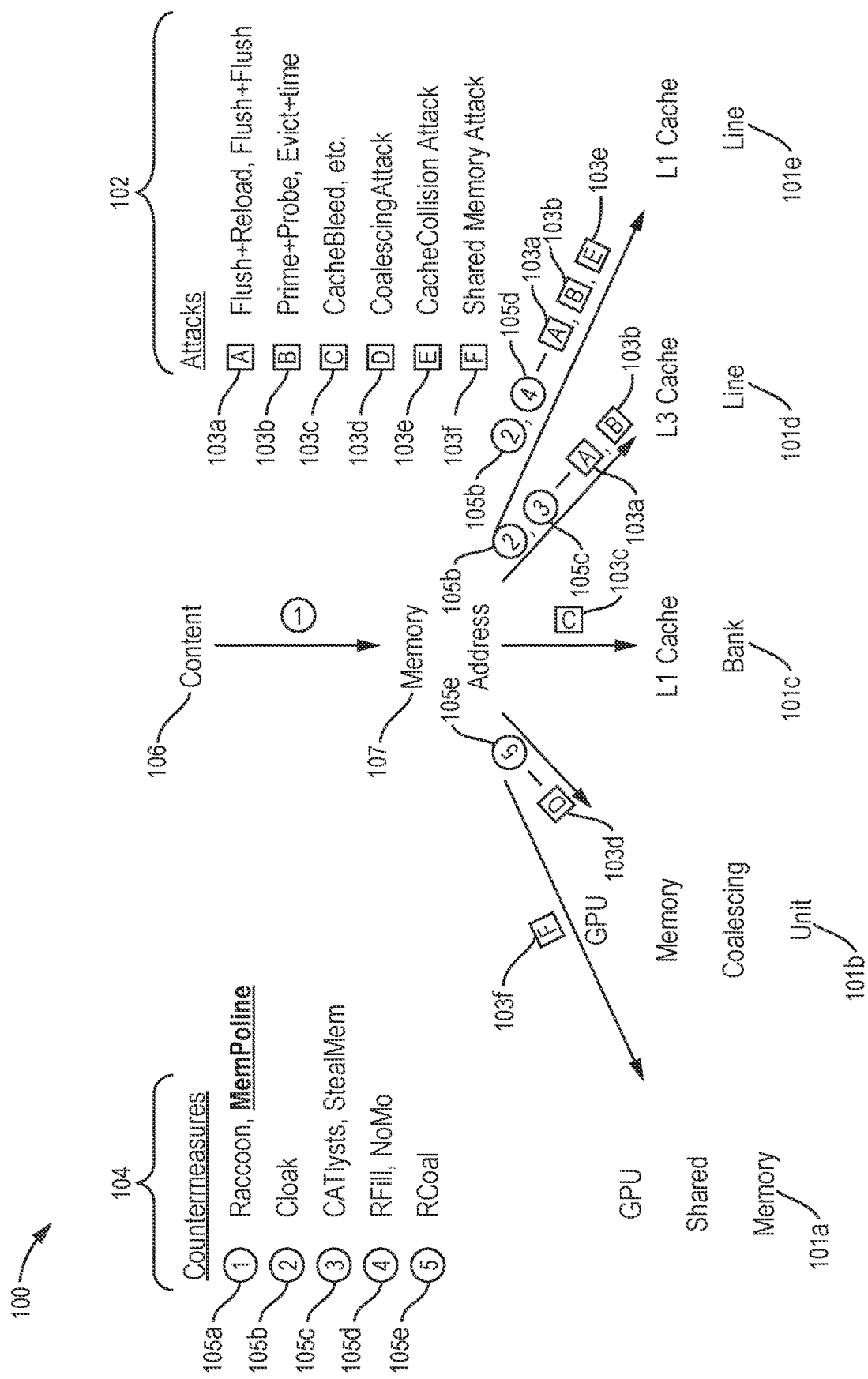
FIG. 1 is a schematic diagram providing a summary of memory-based side-channel attacks and countermeasures.

A description of example embodiments follows.

Side-channel attacks have changed the notion of "security" for cryptographic methodologies despite the mathematically proven security of cryptographic methodologies. Memory-based side-channel attacks exploit a memory access footprint which is inferred from observable microarchitectural events. Such attacks have become a serious cyber threat to not only cryptographic implementations, but also general software bearing secrets. The same cryptographic method implemented on different architectures can be vulnerable to different side-channel attacks. For example, the T-table implementation of Advanced Encryption Standard (AES) is vulnerable to a Flush+Reload cache timing attack [8] on Intel CPUs, and also vulnerable to GPU memory coalescing attacks [12] (bracketed numbers in this document refer to the enumerated list of references hereinbelow). Protecting encryption methodologies against different memory-based side-channel attacks on different architectures is challenging and can be costly in hardware augmentation. Thus, more general countermeasures that address the root cause of information leakage and that work across architectures against various attacks are needed.

Hardware countermeasures that modify the cache architecture and policies can be efficient [4, 15, 20, 21, 28], but they are invasive and require hardware redesign. Further, these hardware countermeasures often times only address a specific attack. Software countermeasures [1, 17, 24, 31] require no hardware modification and make changes at different levels of the software stack, e.g., the source code, binary code, compiler, or the operating system. Software countermeasures are favorable for existing computer systems with the potential to be general, portable, and compatible.

The software implementation of oblivious random access memory (ORAM) scheme shown in prior work [25] has been demonstrated to be successful in mitigating cache side-channel attacks. The ORAM scheme [5, 26] was originally designed to hide a client's data access pattern in remote storage from an untrusted server by repeatedly shuffling and encrypting data blocks. Raccoon [25] re-purposes ORAM to prevent memory access patterns from leaking through cache side-channels.

The Path-ORAM scheme [26] uses a small client-side private storage space to store a position map for tracking real locations of the data-in-move, and assumes the server cannot monitor the access pattern in the position map. However, in side-channel attacks, all access patterns can be monitored, and indexing to a position map is considered insecure against memory-based side-channel attacks. Instead of indexing, Raccoon [25], which focuses on control flow obfuscation, uses ORAM for storing data. Raccoon streams the position map into the server to look for the real data location. As such, Raccoon [25] provides a strong security guarantee. However, since Raccoon [25] relies on ORAM for storing data, its memory access runtime is O(N) given N data elements, and the ORAM related operations can incur more than 100× performance overhead.

Side-Channel Attack Architecture and Existing Countermeasures

When the memory access footprint of an encryption application is dependent on the secret (e.g., key), side-channel leakage of the footprint can be exploited to retrieve the secret. Below is an overview of the microarchitecture of the memory hierarchy. Further, an overview is provided of existing memory-based side-channel attacks and how these attacks infer the memory access pattern from various side-channels exploiting different resources. The description below classifies countermeasures into different categories. In addition, below is a description of two well-known cryptographic methodologies, AES and RSA.

Microarchitecture of the Memory Hierarchy

A cache is a critical on-chip fast memory storage that is deployed for performance to reduce the speed gap between fast computation engines such as CPU and GPU cores and the slow off-chip main memory. Because caches store only a portion of memory content, a memory request can be served directly by the cache hierarchy, referred to as a cache hit, or otherwise by the off-chip memory, referred to as a cache miss. The timing difference between a cache hit and miss forms a timing side channel that can be exploited by the adversary to leak a secret, e.g., key used by an encryption methodology. For example, an adversary can monitor memory accesses and from the observed timing, the adversary can determine if accesses are serviced by the cache or off-chip memory and from this determination, a key can be identified.

The typical structure of a cache is a 2-dimensional table, with multiple sets (rows) where each set comprises multiple ways (columns). A cache line (a table cell) is the basic unit and has a fixed size for data transfer between memory and cache. Each cache line corresponds to one memory block. When the CPU requests a data (with the memory address given), the cache is checked for the corresponding memory block. The middle field of a memory address is used to locate the cache set (row) first, and the upper field of the memory address is used as a tag to compare with all the cache lines in the set to identify a cache hit or miss.

With highly parallel computing resources such as GPUs and multi-thread CPUs, modern computer architecture splits on-chip caches into multiple banks, allowing concurrent accesses to these banks so as to increase the data access bandwidth. For example, in modern Intel processors, the L1 cache becomes three-dimensional (3D), it includes multiple banks and each cache line is distributed into multiple equal sized parts on different banks. On-chip shared memory of many GPUs is also banked. Such banked caches and shared memory are susceptible to a different cache-bank side-channel attack [13, 14, 30].

Another microarchitecture, memory coalescing unit (commonly found on various GPUs), can group concurrent global memory access requests (e.g., in a warp of 32 threads under the single-instruction-multiple-thread execution model on Nvidia Kepler) into distinct memory block transactions, so as to reduce the memory traffic and improve the performance. However, recent coalescing attack [12] has shown that it can also leak memory access pattern of a running application.

Data Memory Access Footprint

Program data is stored in memory, and different methods, programs, applications, etc., use memory addresses to reference the data stored in the memory. If the content-to-memory mapping is fixed, when a secret determines which data to use, an adversary can infer the secret by learning the memory access footprint through various side-channels.

Different microarchitectural resources on the memory hierarchy use a different portion/field of the memory address to index themselves. For example, different levels of caches (L1, L2, and LLC), and cache banks. When observing a victim's access events on the different resources to infer memory access, the memory access footprint retrieved also has different levels of granularity.

Memory-based side-channel attacks exploit sensitive data memory access footprints to retrieve secrets. For example, sensitive data includes the SBox tables of block ciphers such as AES, DES, and Blowfish, and the lookup table of multipliers in RSA. As many microarchitectural resources are shared, the adversary does not need root privilege to access them and can infer the victim memory access footprint by creating contention on the resources. In view of this attack fundamental, countermeasures are proposed to prevent the adversary from learning the memory access footprint.

FIG. 1 is a schematic diagram providing a summary 100 of memory-based side-channel attacks 102 and countermeasures 104. In the summary 100 memory-based side-channel attacks 102 and countermeasures 104 are classified according to the level of mapping they are leveraging and addressing, respectively. FIG. 1 illustrates the relationship between content 106, memory address(es) 107, and resources 101a-e that utilize the content 106 and memory addresses 107. FIG. 1 indicates what resources 101a-e are susceptible to which categories 103a-f of attacks 102. Moreover, FIG. 1 shows what categories 105a-e of countermeasures 104 can be used to protect the resources 101a-e from the attacks 102.

In particular, the GPU shared memory 101a is vulnerable to shared memory attacks 103. Further, the GPU memory coalescing unit 101b is susceptible to coalescing attacks 103d and can be protected using the RCoal countermeasure 105e. The summary 100 also shows that the L1 cache bank 101c is susceptible to CacheBleed style 103c attacks. Further, the L3 cache line 101d is vulnerable to flush+reload, flush+flush attacks 103a and prime+probe and evict+time attacks 103b and can be protected using the cloak category 105b or CATlysts/StealMem category 105c of countermeasures. Moreover, the summary 100 illustrates that the L1 cache line 101e is vulnerable to flush+reload/flush+flush attacks 103a, prime+probe/evict+time attacks 103b, and CacheCollision attack 103e. The L1 cache line 101e can be protected using the cloak category 105b and RFill/NoMo category 105d countermeasures. While the resources 101a-e are vulnerable to various attacks 102 and can utilize different countermeasures 104, embodiments provide functionality that operates differently by protecting the content 106.

Memory-based side-channel attacks can be classified into access-driven and time-driven categories. For a time-driven attack, the adversary observes the total execution time of the victim under different inputs and uses statistical methods with a large number of samples to infer the secret. For an access-driven attack, the adversary intentionally creates contentions on certain shared resources with the victim to infer the memory access footprint of the victim. Access-driven attacks include three steps: (1) preset—the adversary sets the shared resource to a certain state, (2) execution—the victim program executes, and (3) measurement—the adversary checks the state of the resource using timing information.

The graphical summary 100 of FIG. 1 includes five microarchitectural resources 101a-e. The resources L1 cache line 101e, L3 cache line 101d, and L1 cache bank 101c are on CPUs. The resources memory coalescing unit 101b and shared memory 101a are on GPUs. FIG. 1 also illustrates various attacks 102 that utilize these vulnerable resources 101a-e. The attacks 102 are each in a given category 103a-f. The GPU memory coalescing attack [12] 103d, shared memory attack [13] 103f, and CacheCollision [2] attack 103e are time-driven. The remaining attacks, including Flush+Reload [29] 103a, Flush+Flush [7] 103a, Prime+Probe [22, 27] 103b, Evict+Time [27] attack 103b, and CacheBleed [30] 103c, are access-driven. The aforementioned access-driven attacks 103a, 103b, and 103c, differ in the way of presetting the shared resource, and how to use the timing information to infer victim's data access.

FIG. 1 also illustrates countermeasures 104 which are each in a respective category, 105a-e. Existing countermeasures are built on top of three principles to prevent information leakage: partitioning, pinning, and randomization. Partitioning techniques [4, 17, 24, 28, 31], including StealMem [17] 105c and NoMo [4] 105d, split a resource among multiple software entities (processes), so that one process does not share the same microarchitectural resource with another. This resource splitting prevents a side-channel from forming. Pinning techniques [3, 6, 19, 28], including CATlysts [19] 105c and Cloak [6] 105b, preload and lock one entity's security sensitive data in the resource prior to computations, so that any key-dependent memory access to the locked data will result in a constant access time. Randomization techniques, such as RFill [20] 105d, RCoal [15] 105e, and Raccoon [25] 105a, randomize the behavior of the memory subsystem resources so that the adversary cannot correlate the memory access footprint to content used in the computation. Hardware countermeasures [15, 20] randomize the mapping between the memory address 107 and on-chip microarchitectural resources. For example, RFill [20] 105d protects the L1 cache line 101e and RCoal [15] 105e targets the memory coalescing unit 101b and randomizes its grouping behavior. Embodiments, e.g., MemPoline, are in the same category 105a of software as ORAM [25, 26], which randomizes the content 106 to memory address 107 mapping.

FIGS. 2A-D illustrate functionality of an existing methodology, Path ORAM, for protecting against memory-based side-channel attacks. ORAM is a memory obfuscation scheme that attempts to access memory without revealing the access pattern. In ORAM, data blocks are randomly stored and a position map keeps track of the real location of the data blocks. ORAM shuffles data blocks for every memory access. ORAM is designed for remote storage. The client does not want the server to know what data block is being accessed. The client and server are connected via a network and the position map is stored on the client side. FIGS. 2A-2D demonstrate behavior of Path ORAM, which is the best performing ORAM methodology, with O(log(N)) per memory access of N data blocks.

Figure 2A:
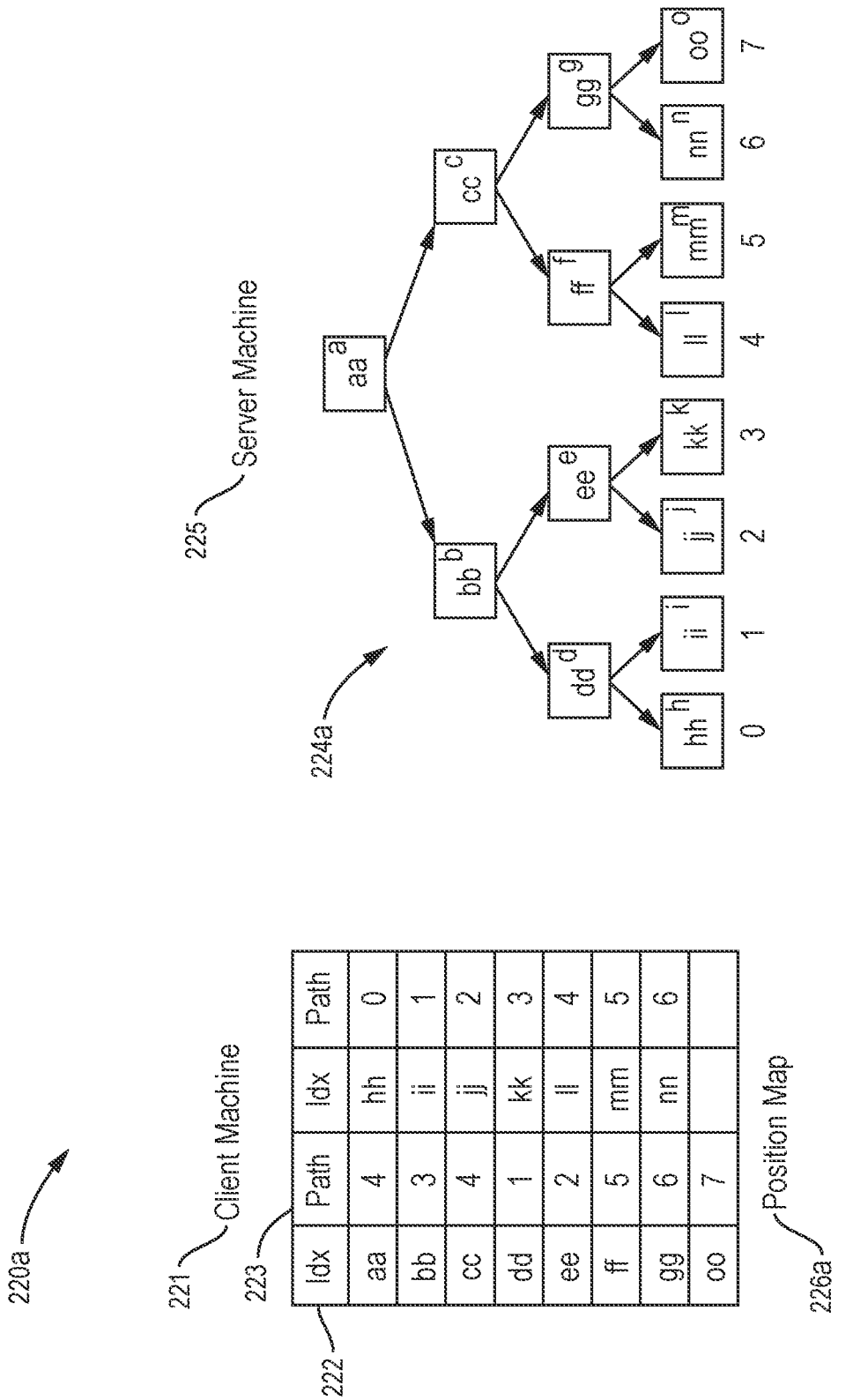
FIGS. 2A-D illustrate functionality of an existing methodology for protecting against memory-based side-channel attacks.
Figure 2B:
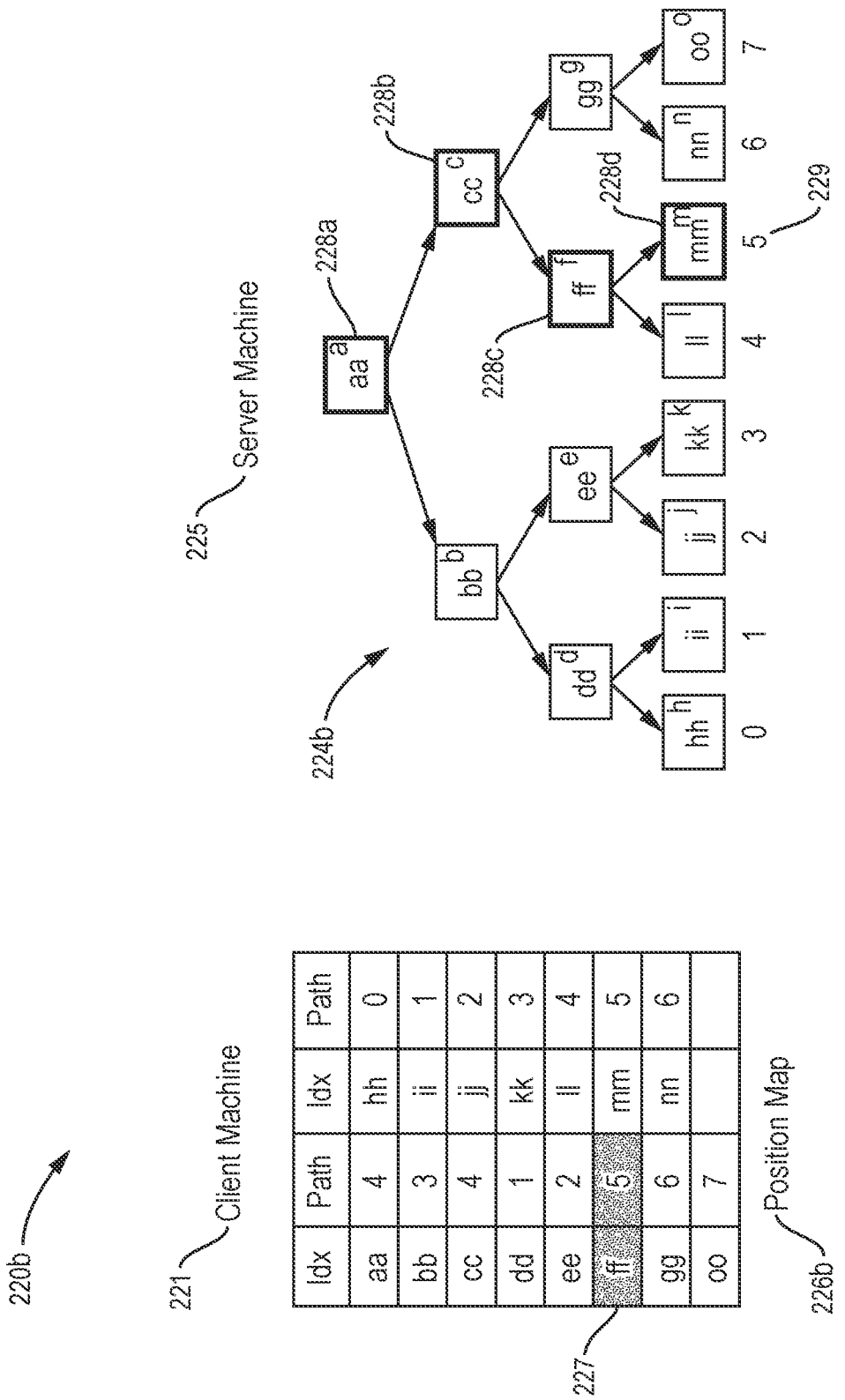
Figure 2C:
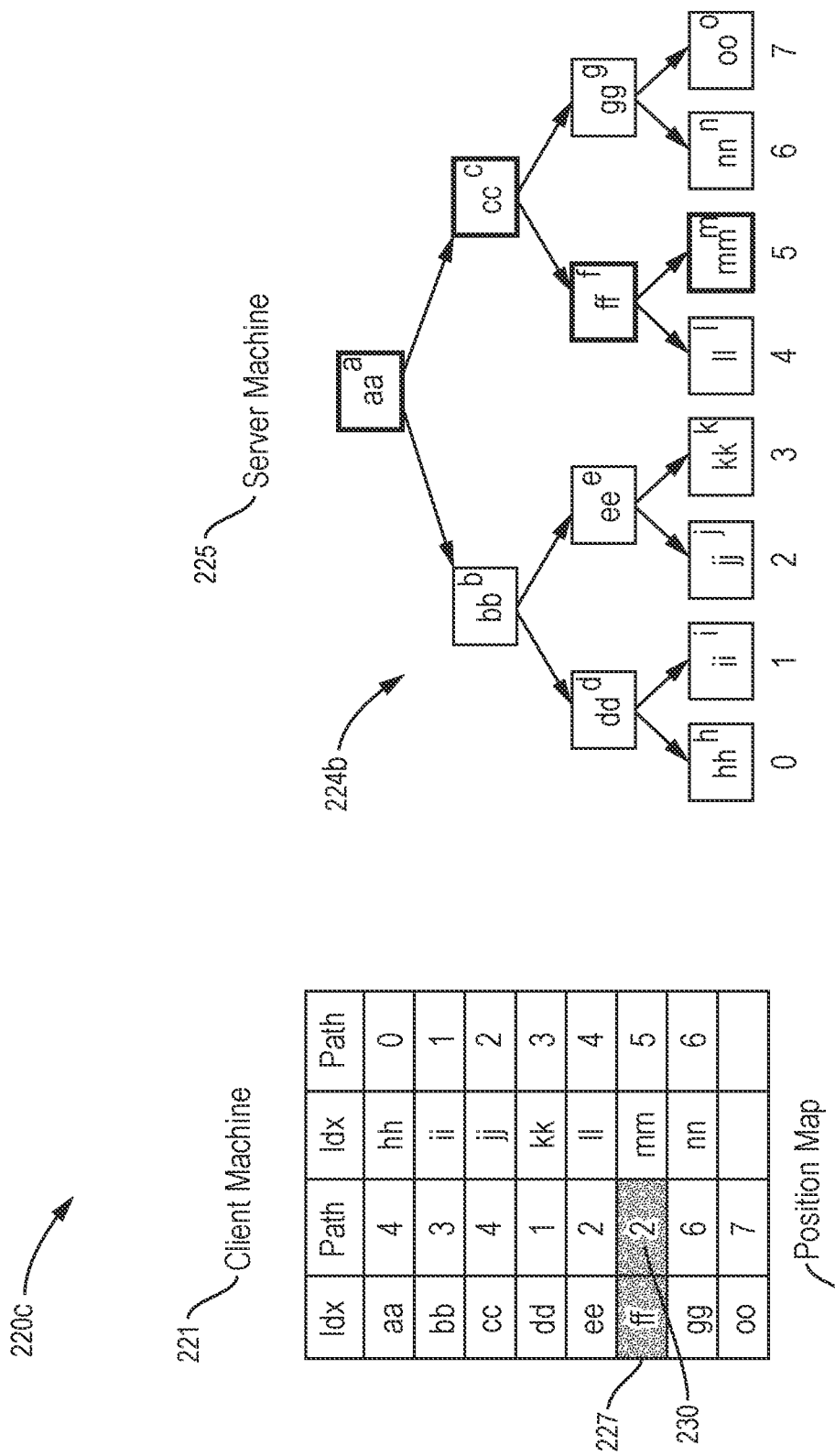
Figure 2D:
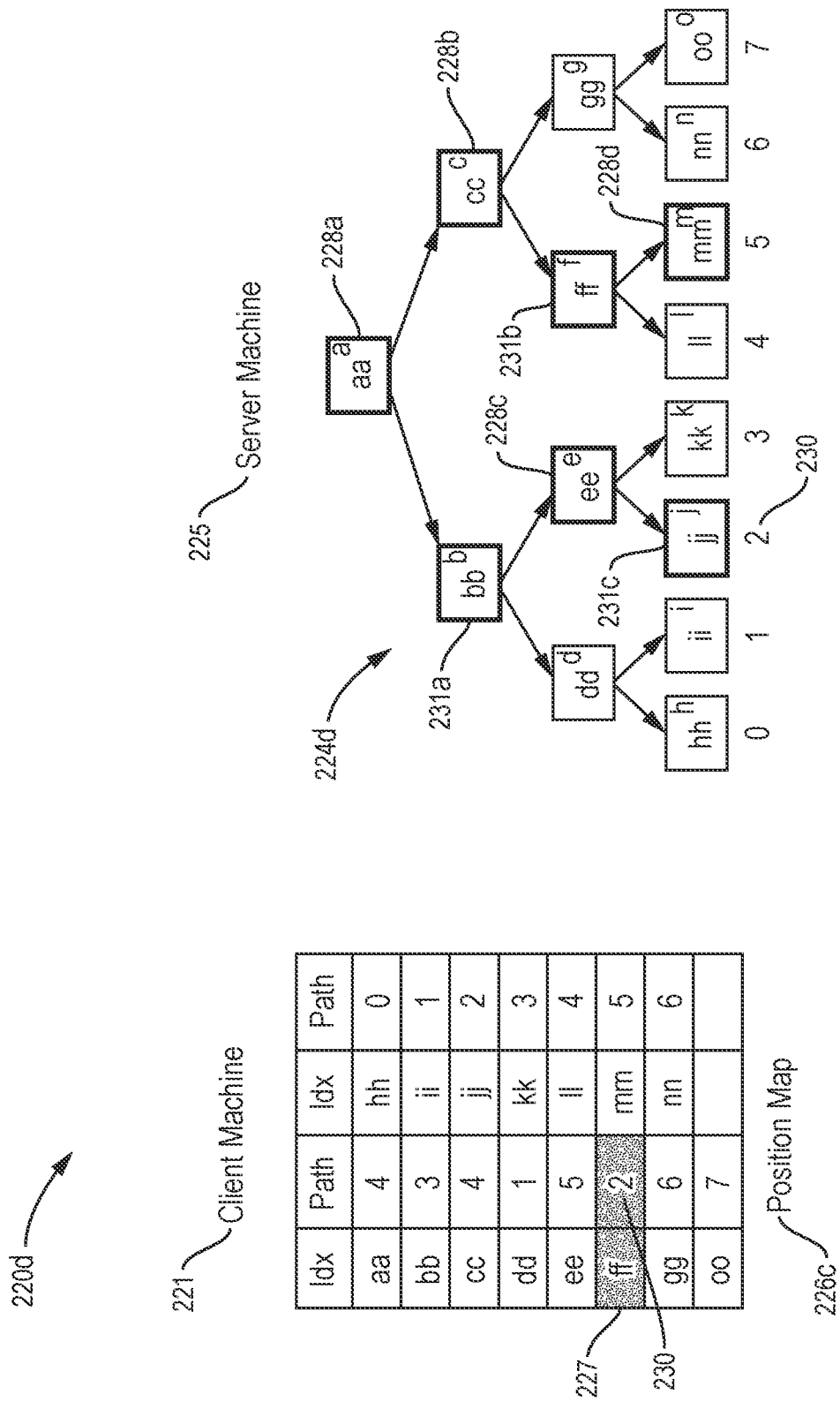

FIG. 2A shows a first stage 220a of a Path ORAM technique. At stage 220a there is a position map 226a stored on a client machine 221 that stores the identifiers 222 and paths 223 for data in the graph 224a on the server 225. At stage 220b, depicted in FIG. 2B, data block 227 (ff) is accessed from the position map 226b. At the server machine 225 data blocks 228a-d in path 229 (5) of graph 224b are loaded. During stage 220c depicted in FIG. 2C, a random path 230 for data block 227 FF is generated. In stage 220d, all data blocks 231a-c in path 230 are loaded and data block 231b is swapped with data block 228c in the graph 224c. As shown in FIGS. 2A-D, accessing a single data block 227 requires the loading of multiple data blocks 228a-d and 231a-c in at least two paths 230 and 229. This Path ORAM scheme requires significant computational overhead.

ORAM techniques can be vulnerable to side-channel attacks. In particular, the position map is vulnerable to side-channel attacks. The position map is stored on the same physical machine as the client and accessing the position map can leak the memory access pattern. Malicious users can monitor the position map instead of the original data structure. An existing solution loads and checks the entire position map for the targeted data block. The performance is O(N) per memory access. This is very costly, and results in a 100× performance degradation due to the ORAM related operations.

Vulnerable Ciphers

AES is a common encryption methodology that is vulnerable to memory-based side-channel attacks. The results described below evaluate a 128-bit Electronic Code Book (ECB) mode T-table implementation of AES encryption commonly used in prior work [2, 12, 13, 27]. The AES encryption method consists of nine rounds of SubByte, ShiftRow, MixColumn, and AddRoundKey operations, and one last round of three operations without the MixColumn operation. In the T-table-based implementation of AES, the last round function can be described by $c_i = T_k[s_j] \oplus rk_i$, where $c_i$ is the $i^{th}$ byte of the output ciphertext, $rk_i$ is $i^{th}$ byte of the last round key, $s_j$ is the $j^{th}$ byte of the last round input state (j is different from i due to the ShiftRow operation), and $T_k$ is the corresponding T-table (publicly known) for $c_i$. Memory-based side-channel attacks can retrieve the last round key by inferring the victim's memory access pattern to the public-known T-tables, with $s_j$ inferred and $c_i$ known as the output.

RSA is an asymmetric cipher with two keys, one public and one private. The major computation operation is modular exponentiation, $r = b^e$ mod m. In decryption, the exponent e is the private key and is the target of side-channel attacks. For the sliding-window implementation of the RSA method, the exponent is broken down into a series of zero and non-zero windows. The method processes these windows one by one from the most significant one. For each exponent window, a squaring operation is performed first. If the window exponent is non-zero, another multiplication routine is executed with a pre-calculated multiplier selected using the value of the current window. For a window of n-bit, there are $2^{n-1}$ pre-calculated multiplier values stored in a table for conditional multiplications (only odd numbers for non-zero windows). Tracking which multiplier in the sensitive multiplier table has been used leads to the recovery of the window exponent value.

Threat Model

The threat model considered herein includes co-residence of the adversary and victim on one physical machine. Herein, this threat model is used in describing both attack implementations and evaluation of countermeasure embodiments. However, it is noted that embodiments may also be implemented in other environments, e.g., cloud environments. The adversarial goal is to recover the secret key of a cryptographic method using memory-based side-channel attacks.

The threat model assumes the adversary is a regular user without root privilege, and the underlying operating system is not compromised. The adversary cannot read or modify the victim's memory, but the victim's binary code is publicly known (the common case for ciphers). The adversary can interact with the victim application. For example, the adversary can provide messages for the victim to encrypt/decrypt, receive the output, and also time the victim execution. The description herein elaborates on protecting secret-dependent data memory access, and may also be expanded to protect instruction memory access. The threat model also assumes the granularity of information the adversary can observe is at cache line or bank level, and the adversary can statistically recover a secret using at least 100 observations. Currently, the most efficient and accurate memory-based side-channel can monitor the memory access at the cache line granularity and needs a few thousand observations to recover the AES key as shown in prior work [9].

Figure 3C:
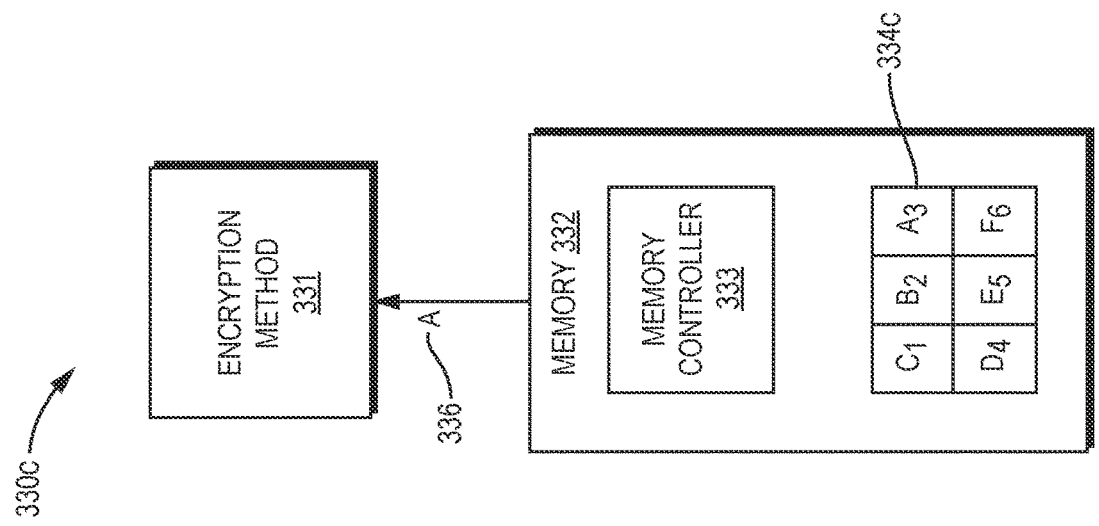
FIGS. 3A-C show a system, according to an embodiment, implementing functionality to protect against memory-based side-channel attacks.
Figure 3B:
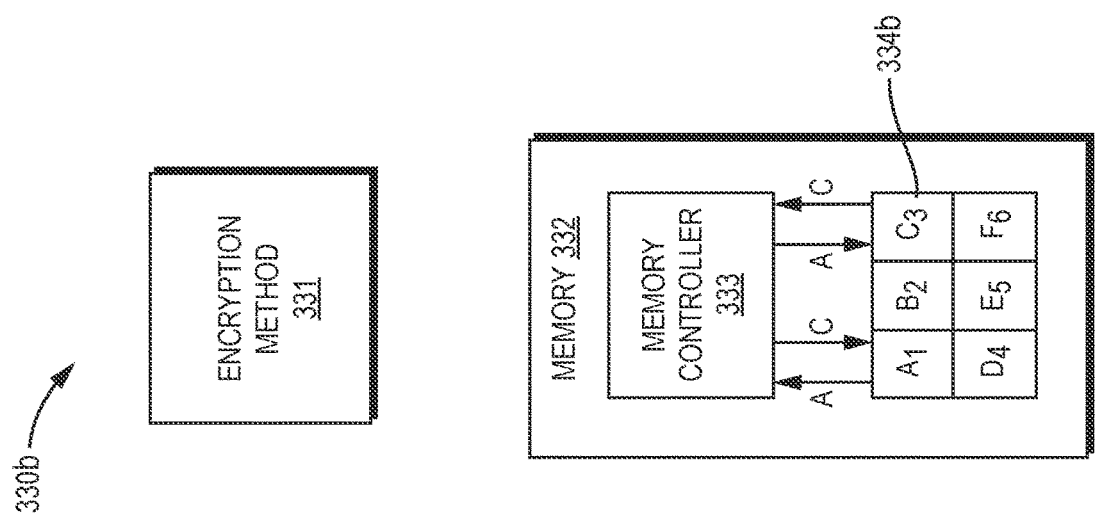
Figure 3A:
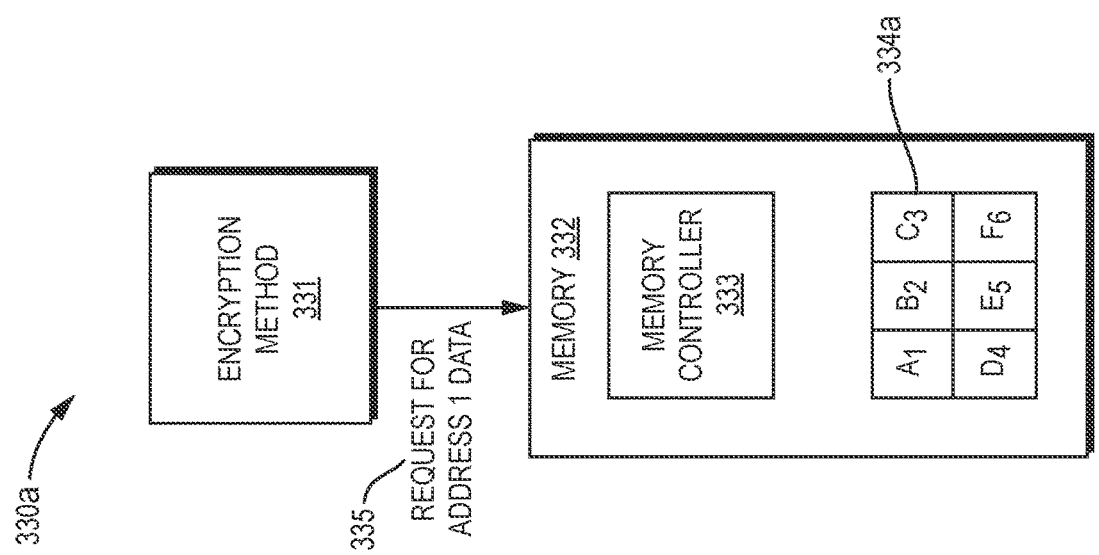

FIGS. 3A-C illustrate three stages 330a-c of a system, according to an embodiment, implementing functionality to protect against memory-based side-channel attacks. The system includes an encryption methodology module 331 and memory 332. The memory 332 includes a memory controller 333 and allocated storage space 334a-c, generally referred to as 334. The storage space 334 includes the addresses 1-6 and the data A-F. During the stage 330a, the encryption module 331 sends a request 335 for the address 1 data. In stage 330b, in response to the request 335, the memory controller 333 determines a storage address for another piece of data (B-F), i.e., a piece of data that is not A, using the address of A (1), a permutation function, e.g., XOR, and a random number. In this simplified example, the determined storage address is 3. In turn, during the stage 330b, the memory controller 333 retrieves the data A from address 1. Moreover, the memory controller 333 swaps the data A at address 1 and the other data (C) at the determined address 3. It is noted that while this swapping is depicted in stage 330b, embodiments are not limited to performing the swapping at this time. For example, embodiments may perform the swapping after servicing the request as shown in stage 330c. Embodiments may implement the swapping by having the memory controller 333 execute follow-on instructions that direct the swapping of data A at address 1 and the other data (C) at the selected address 3. An embodiment performs this swapping by sending the requested addresses, e.g., 1 and 3, to the storage space 334 and, in turn, receiving the data, e.g., A and C, from the storage 334. The data A and C is then sent to other addresses to complete the swapping.

FIG. 3C depicts the stage 330c where the memory 332 responds to the request 335 and provides 336 data A to the encryption method 331. The allocated memory 334c in stage 330c shows the results of the aforementioned swap where data C is at address 1 and data A is at address 3.

Figure 4:
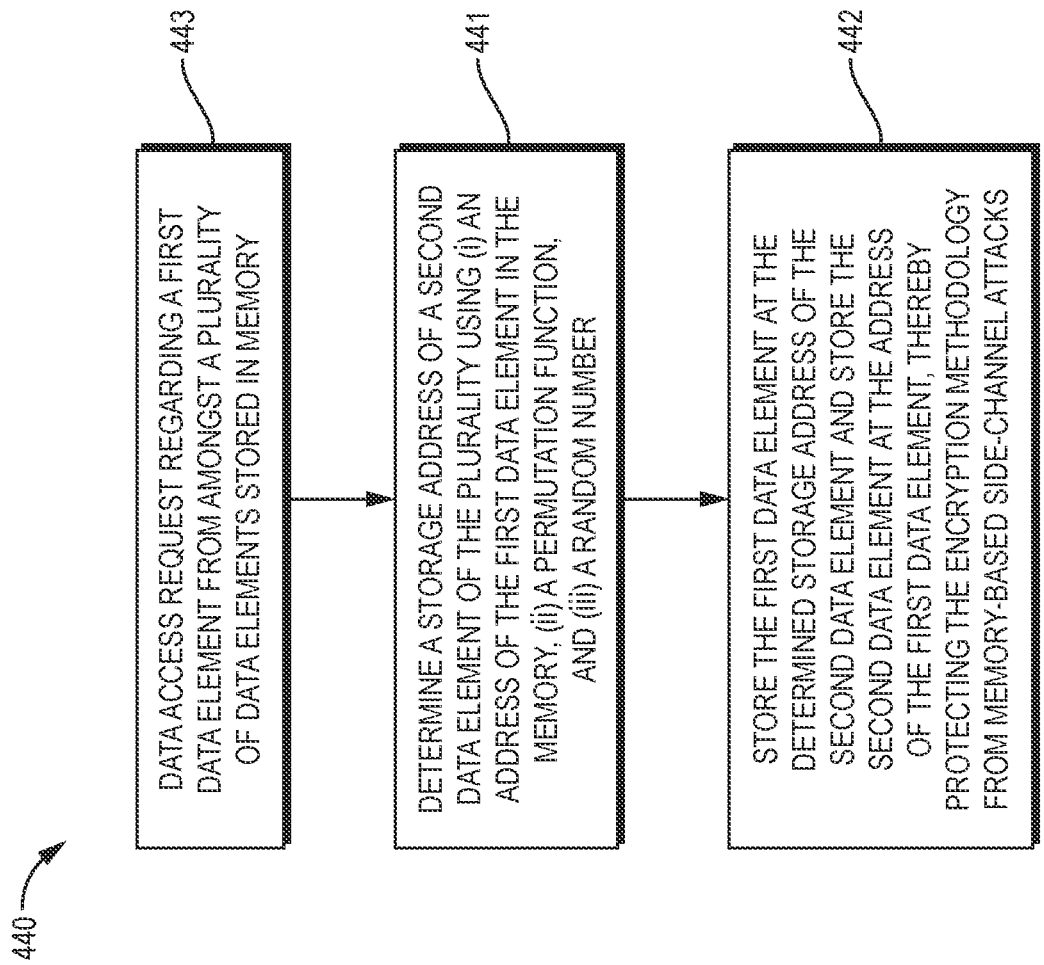
FIG. 4 is a flowchart of a method for protecting against memory-based side-channel attacks according to an embodiment.

FIG. 4 is a flowchart of a method 440 for protecting against memory-based side-channel attacks according to an embodiment. The method 440 begins in response to a request 443 regarding a first data element. Said request 443 may be a data access request, amongst other examples. In an embodiment, the request 443 is by an encryption methodology and the request pertains to a first data element from amongst a plurality of data elements stored in memory. In an embodiment, the plurality of data elements are sensitive data elements used by the encryption methodology.

At 441, the method 440 determines a storage address of a second data element of the plurality using (i) an address of the first data element (the requested data element) in the memory, (ii) a permutation function, and (iii) a random number.

In turn, at 442, the locations of the first data and second data element are swapped so as to protect the encryption methodology from memory-based side-channel attacks. This swapping includes storing the first data element at the determined storage address of the second data element and storing the second data element at the address of the first data element.

Embodiments of the method 440 may further include an initialization procedure. In one such embodiment, the random number is a second random number and the method further comprises, prior to receipt of the request 443, storing each of the plurality of data elements at random locations in the memory, wherein each random location is a function of a first random number. Such an embodiment may further include specifying a region in the memory. In an embodiment, the random locations where the plurality of data elements are stored are in the specified region in the memory. The initialization, according to another embodiment of the method 440, includes specifying a safe region in the memory and loading each of the plurality of data elements to addresses in the specified safe region. According to an embodiment of the method 440, the plurality of data elements stay in this specified region throughout the determining 441 and storing 442 functionality of the method 440.

In an embodiment, the "random number" utilized at 441 is any such random number or pseudo-random number as is known in the art. Moreover, the method 440 may use any permutation function known to those of skill in the art at 441. The various permutation functions may provide different levels of efficiency. According to an example embodiment, the permutation function used at 441 is an XOR function. XOR is particularly efficient and satisfies the progressive updating requirement of embodiments of the method 440.

Implementations of the method 440 may track update, i.e., swapping, status for each of the plurality of data elements. According to such an embodiment, update status is associated with storage addresses of the plurality of data elements. In an embodiment the tracking includes creating a bit-map wherein each of the plurality of data elements has an associated one-bit indicator of update, i.e., permutation, status. This one-bit indicator signifies the random number used to determine the address at which the data element is stored. In this way, an embodiment does not need to store addresses for data. Instead an original address where a data element was stored can be determined by reversing the permutation functions using the current address of the data element and the random number, which is indicated in the bit-map.

The method 440 may continue for any number of requests 443 for various data elements. For every request 443 the determining 441 and storing 442 are iterated, i.e., repeated, using the data address of the requested data element. In such an embodiment, in at least one given iteration, the random number is modified, and an embodiment converts the memory region into a permuted state and updates the random number. Embodiments may further include selecting the at least one given iteration in which to modify the random number, i.e., such an embodiment may select length of an epoch. The iteration in which to modify the random number may be selected as a function of the encryption methodology. As such, embodiments may customize the frequency with which the random number is updated. Similarly, another embodiment of the method 440 updates the random number according to a preset epoch length. According to an embodiment, epoch length is in terms of a number of requests to access the plurality of data elements. In such an implementation each random number is used for one epoch (number of data requests). An embodiment of the method 440 selects at least one given iteration in which remaining unpermuted data in the memory region should be permuted and, such an embodiment permutes this remaining data in the selected iteration and generates a new random number.

In an embodiment of the method 440 where the random number is modified, the plurality of elements are stored at an address that is either a function of the previous random number or at an address that is a function of the current random number. As requests 443 continue, the data elements stored as a function of the previous random number migrate to being stored as a function of the current random number. Embodiments of the method 440 may swap additional elements per request 443. If desired, the number of swaps for each data access can be increased to expedite randomization and the migration to storing values as a function of the current random number. Further, in an embodiment, if a request 443 pertains to a data element that is already stored as a function of the current random number, no further permutation may be carried out. In other words, the data element's location would not be changed if the data element is already stored at an address that is a function of the current random number.

In an embodiment of the method 440 where the random number changes, each of the plurality of data elements is stored at an address that is a function of a first random number or a second random number. In such an embodiment, at any time during the execution of the encryption methodology, there are two random numbers associated with the data structure in which the plurality of elements are stored. As such, each element is in one of two states specified by one of the two random numbers. According to an embodiment, size of the first random number and second random number is determined by a platform microarchitecture according to the platform microarchitecture's cache structure and the encryption methodology sensitive data structure. With typical 64-byte cache line and 4-byte cache bank, the random number is a byte.

The method 440 may also service the request 443 by providing the first data element to the encryption methodology. If the request 443 is a read request, the requested data is provided before storing the requested data (first data element) in the memory with a permuted address, i.e., the determined 441 address.

Design Overview

The high-level idea of an embodiment, which may be referred to herein as MemPoline, is to progressively change the organization of sensitive data in memory from one state to another directed by an efficient parameter-based permutation function. This progressive change decorrelates the microarchitectural events the adversary observes and the actual data used by the program, e.g., encryption method. Here, the sensitive data refers to data whose access patterns should be protected, instead of data itself.

To obfuscate memory accesses, an embodiment randomizes the data layout in memory through permutation, e.g., the storing 442. However, the frequency of permuting and the implementation method have a significant impact on both the security and performance of the countermeasure. Embodiments implement permutation gradually through subsequent swapping instead of at once. Embodiments bounce the data to be accessed around before the access (load or store). Once the layout of the data reaches a permuted state, the parameter, e.g., random number, is updated and the data layout continues to be migrated to the next permuted state. This procedure allows embodiments to slowly de-associate any memory address from actual data content. Thus, the countermeasure can provide a level of security that defends against memory-based side-channel attacks with a significant performance gain over the existing ORAM-based countermeasure. An insight for such efficient permutation is that the granularity of cache data that a memory-based side-channel attack can observe is limited and, therefore, can be leveraged to reduce the frequency of permuting to be just-in-need, lowering the performance degradation.

An embodiment of the countermeasure comprises two major actions at the user level: one-time initialization and subsequent swapping for each data access (swapping storage addresses of the accessed data unit and another data unit selected by the random parameter). During initialization, the original data is permuted and copied to a dynamically allocated memory (SMem). Such a permuted state is labeled by one parameter, a random number r, which is used for bookkeeping and tracking the real memory address for data access. For example, the data element pointed to by index i in the original data structure is now referred by a different index in the permuted state, $j=f_{perm}(i, r)$ in SMem, where r is a random value and $f_{perm}$ is an explicit permutation function. The memory access pattern in SMem can be obfuscated through changing the value of r.

The updating rate of r is critical for both side-channel security and performance. If the value of r were fixed, the memory access pattern would be fixed. This would only increase the attack complexity as the adversary would need to recover the combination of r and the key value instead of just the key value. The side-channel information leakage may be the same. On the other hand, if the value of r were constantly updated every time one data element is accessed, the memory access pattern would be truly random. Such updating frequency could provide the same level of security guarantee as ORAM [5, 26], while also inheriting excessive performance degradation.

Embodiments set the frequency of changing the value of r to a level that balances security and performance, and implement permutation through subsequent swapping rather than one-time action. This way embodiments provide a security level for defending against memory-based side-channel attacks which is attained with much better performance compared to ORAM.

What follows is a definition of the data structures of SMem in view of the memory hierarchy structure and a set-up of auxiliary data structures. Then, the two actions of embodiments.

Initialization—Define the Data Structures

SMem is a continuous memory space allocated dynamically. An embodiment defines the basic element of SMem for permutation as limb, with its size equal to that of a cache bank, which is commonly 4 bytes in modern processors. It is assumed, in an embodiment, that SMem is a 4-byte addressable and continuous memory space.

Considering the cache mapping of SMem, SMem is considered a two-dimensional table, where rows are cache lines, columns are banks, and each cell is a limb (4 bytes). It is noted that embodiments do not need to consider ways (as in cache) because ways are not addressable. As the observation granularity of memory-based side-channel timing attacks is either cache line or cache bank, when a limb is moved around, both the row index and column index should be changed to increase the entropy of memory access obfuscation. An embodiment divides limbs into multiple equal-sized groups, and permutations take place within each group independently. To prevent information leakage through monitoring cache lines or cache banks, groups are uniformly distributed in rows and columns, i.e., considering each row (or column), there should be an equal number of limbs from each group.

Figure 5A:
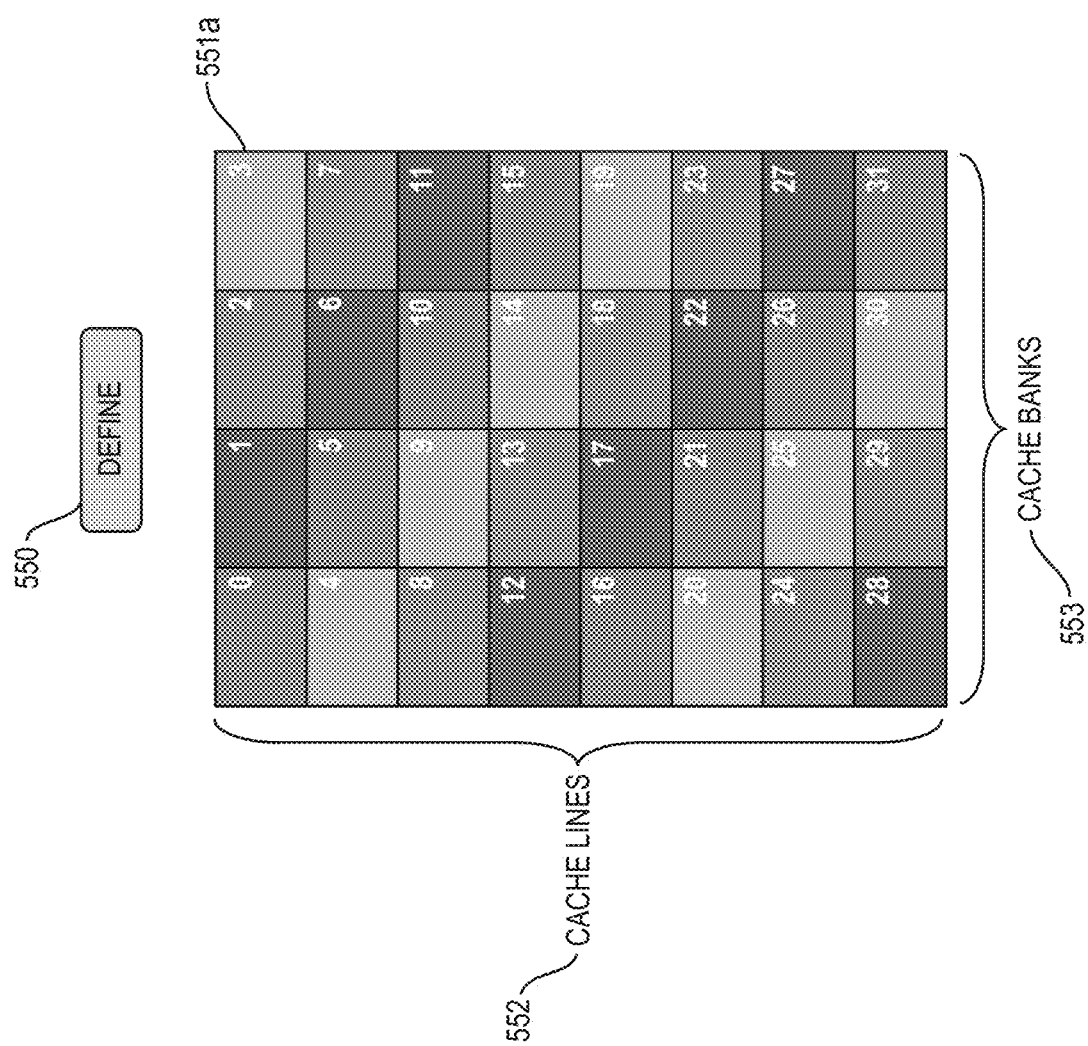
FIGS. 5A-C graphically illustrate data structures utilized by embodiments and actions implemented by embodiments.

FIG. 5A shows an example SMem 551a (generally referred to as 551) during a define 550 stage. In the defined memory space 551, the rows 552 are cache lines and the columns 553 are cache banks. In SMem 551, the number of groups (shown by the color coding, where the groups include [0, 5, 10, 15, 16, 21, 26, 31], [4, 9, 14, 19, 20, 25, 30, 3], [8, 13, 18, 23, 24, 29, 2, 7], and [12, 17, 22, 27, 28, 1, 6, 11]) is equal to the number of columns 553. The groups are formed diagonally and the number of limbs (8) in a group equals the number of rows 552. As such, each group has an equal number of limbs. With this well-balanced grouping, when a limb moves around within its group, directed by the parameter-based permutation function, the limb can appear in any cache line 552 or cache bank 553, obfuscating the memory access and therefore mitigating information leakage. In an embodiment, groups are treated independently. In particular, limbs are shuffled amongst their own group, which allows each group to be independent of each other group. An embodiment may use different random numbers for each group and, as such, the shuffling is within the group. Note, that in modern computer systems, the cache line size 552 is the same throughout memory hierarchy: Last-Level-Cache (LLC), L2, L1, and even memory coalescing unit. Therefore, embodiments can mitigate information leakage of different memory hierarchy levels simultaneously.

In SMem 551, for each group, initialization sets the group in a permuted state, described by r1. During program execution, as the permuted state gradually updates to $r_2$, at any time, the group is in a mixed state as some limbs are in $r_1$ and other limbs are in $r_2$. Once the entire group reaches $r_2$ state, $r_1$ is obsolete and is updated with $r_2$, and a new random number is generated for $r_2$. Along the temporary horizon, the progression from a starting permuted state $r_1$ to another permuted state $r_2$ is defined as an epoch. For a limb originally indexed by i, the new location in SMem can be found by $f_{perm}(i, r_1)$ if it is in $r_1$ state, otherwise, the new location is $f_{perm}(i, r_2)$.

To keep track of which permuted state the limb, i, is located in, a bitmap is allocated during the initialization and keeps updating. When bitmap$[f_{perm}(i, r_1)]$ is 1, the limb i is in the $r_1$ permuted state; otherwise, the limb is in the $r_2$ permuted state. Note that the bitmap does not need to be kept private since it is indexed using the permutation function.

Initialization—Loading Original Sensitive Data

Embodiments load the original sensitive data to SMem for two reasons: compatibility and security. The original sensitive data in a vulnerable program, e.g., encryption method, may be statically or dynamically allocated. To make embodiments compatible to both situations, the original data is loaded to a dynamically allocated region SMem. Such functionality will only incur overhead for statically allocated data.

The original sensitive data in memory is byte addressable. For program data access, the unit can be multi-byte, which should be aligned with the limb size (determined by the cache bank size). For example, for T-table based AES, the data unit size is four bytes, fitting in one limb; for a SBox-based implementation, the unit is one byte, and three bytes are padded to make one limb. Therefore, each data unit occupies one or multiple continuous limbs.

To map a data unit indexed by i to a location in SMem, an embodiment determines the data unit's coordinate in SMem, i.e., the row and column, and, then, the group ID can be derived correspondingly. It is noted that unlike existing ORAM approaches, embodiments do not rely on an auxiliary mapping table to determine a location for i as the mapping table is also side-channel vulnerable. Instead, embodiments develop functions to associate i with a memory address through private random numbers. For simplicity, it can be assumed that each data unit occupies one limb in SMem, and the approach can be extended to general cases where a data unit occupies two or more limbs, e.g., the table of multipliers in the sliding window implementation of RSA.

Figure 5B:
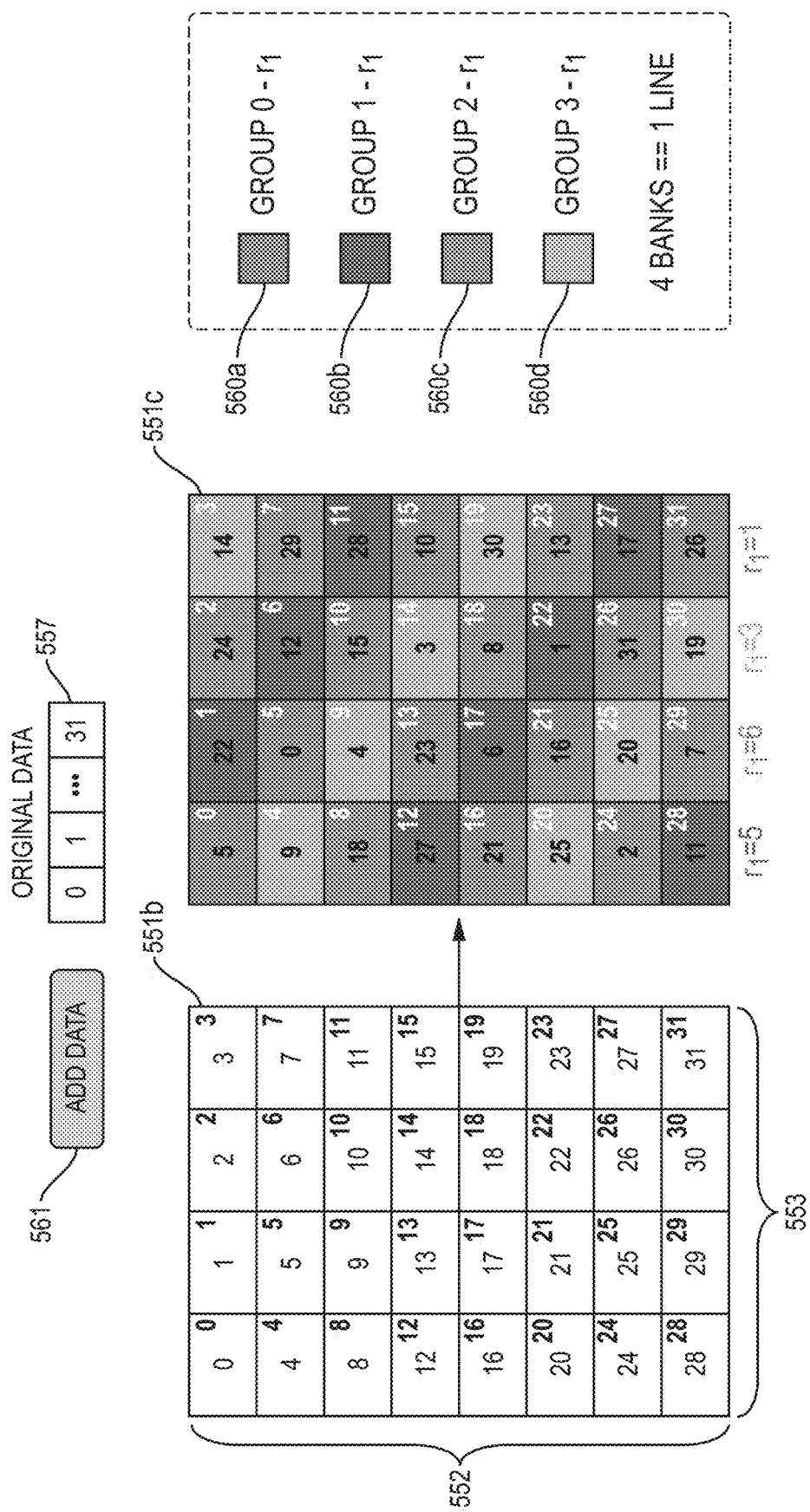

The add data stage 561 is depicted in FIG. 5B. The add data stage 561 of FIG. 5B and define data stage 550 of FIG. 5A may make-up an initialization stage. In the add data stage 561 data is added to the previously defined memory 551b.

The embodiment in FIG. 5B starts filling SMem 551b row by row in the same manner as data is stored in consecutive data structure 557. In FIG. 5B the data unit index i from the table 557 directly translates to the limb memory address in the data structure 551b. In each cell of the memory 551b, the number in the middle is the original data index from the table 557 and the number at the top-right corner is the SMem 551b address.

When permuting, the content moves from the locations shown in SMem 551b to the locations shown in SMem 551c. For the given example in FIG. 5B, the 32 limbs (eight rows 552 and four columns 553) are divided into four diagonal groups 560a-d shown by the color-coding where the green group 560a includes data elements [5, 0, 15, 10, 21, 16, 31, 26], the yellow group 560d includes data elements [9, 4, 3, 30, 25, 20, 19, 14], the orange group 560c includes data elements [18, 23, 8, 13, 2, 7, 24, 29], and the blue group 560b includes data elements [27, 6, 1, 17, 11, 22, 12, 28]. In each group 560a-d, a specific random number, $r_1$, is chosen to perform permutation. In the example of FIG. 5B, the blue group 560b was stored using $r_1$ of 5, the orange group 560c was stored using $r_1$ of 6, the yellow group 560d was stored using $r_1$ of 3, and the green group 560a was stored using $r_1$ of 1. The permutation function used for storing the data in FIG. 5B is exclusive OR, satisfying $i_1 \oplus r_1 = j_1$. The content in address $j_1$ and $i_1$ will swap. For each group of eight limbs as shown in FIG. 5B, four swappings are performed directly by its corresponding initial $r_1$. The entire SMem 551c is now in the $r_1$ permuted state. In this way, in FIG. 5B, the data from the original table 557 is grouped into the aforementioned diagonal groups and data within the group is also shuffled as part of this initialization procedure.

To handle the case when a data unit occupies multiple limbs, an embodiment treats the data unit i as a structure consisting of multiple limbs (assuming n is the number of limbs in one data unit). The loading and initial permutation operations are still performed at the granularity of limb, and one data access now translates to n limb accesses. After permutation, these limbs are scattered in SMem and are not necessarily consecutive. Upon data access, the individual limbs can be located and gathered to form the data unit requested by the program execution.

Epochs of Permuting

After initialization (defining 560 and adding 561), the program execution is accompanied by epochs of permutations of SMem, distributed across data accesses. For each data access, given the index in the original data structure, an embodiment locates the limbs in SMem, and moves data units in the permuted state of $r_1$ to $r_2$. The procedure is described in Listing 1.1.

| Listing 1.1: Locating data unit i in SMem |
| --- |
| 1    mp locate and swap(i): |
| 2    j1 = r1 index(i) |
| 3    j2 = r2 index(i) |
| 4    // 3rd argument: false = fake swap, true = real swap |
| 5    oblivious swap(j2, j2, bitmap [j1] == 1) |
| 6    random perm(group index(i)) |
| 7    j2 = r2 index(i) |
| 8    return address at j2 |

Locating Data Elements

The data unit indexed by i in the original data structure exists in SMem with two possible states, either in the $r_1$ permuted state at $j_1 = i \oplus r_1$ or in the $r_2$ permuted state at $j_2 = i \oplus r_2$, depending on the value of bitmap$[j_1]$, where bitmap

[$j_1$]=1 indicates i in the $r_1$ permuted state and bitmap[$j_1$]=0 indicates i in the $r_2$ permuted state.

Figure 5C:
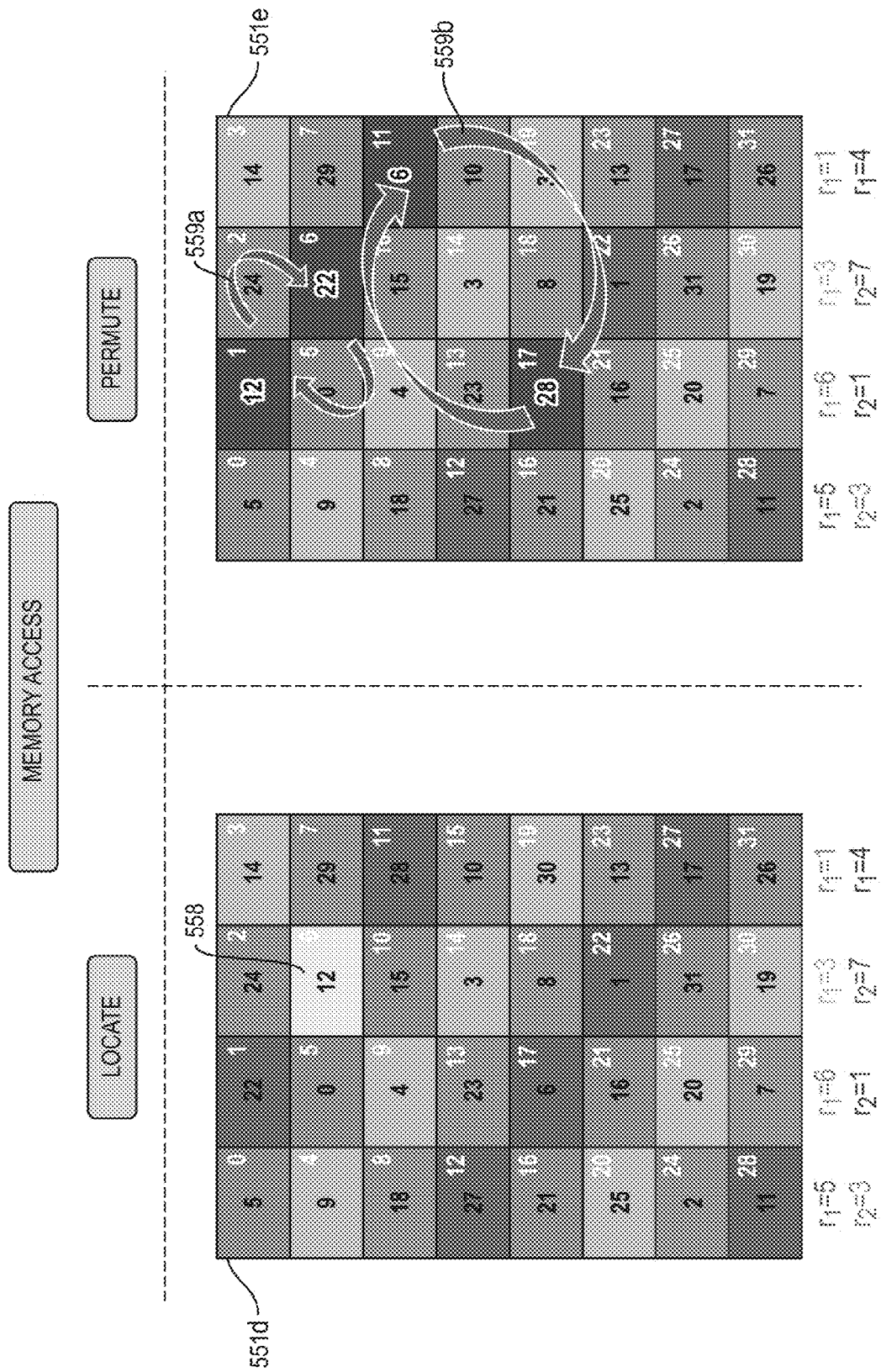

In the SMem 551*d* shown in FIG. 5C, the data element 12, indicated with reference numeral 558, is located by searching the bitmap to determine if the data element is in the $r_1$ or $r_2$ permuted state. After that determination, the appropriate equation $j_1=i\oplus r_1$ or $j_2=i\oplus r_2$ is used to determine the location of 12 (558) at the 6 address in SMem 551*d*.

Permuting

Once the data element is located, an embodiment performs an oblivious swap depending on which permuted state the element is in. If the element in state $r_1$ (bitmap[$j_1$] is 1), such an embodiment swaps the data element with the content at $j_2$ in SMem. If bitmap[$j_1$] is 0, such an embodiment performs a fake swap procedure (memory access to both locations, without changing data content in them) to disguise the fact that i is in $j_2$.

To guarantee that at least one data unit will be moved to $r_2$ permuted state per memory access, an embodiment performs an additional random pair of permutations by swapping $j_3$ and $j_4$ in the same group as shown in SMem 551*e* of FIG. 5C. In particular, the swap 559*a* swaps elements 12 and 22 and the swap 559*b* swaps the elements 6 and 28. This procedure, random perm shown in Listing 1.1, will also add noise to the memory access pattern.

In embodiments, the frequency with which the parameter, e.g., random number, is being updated determines the security level. The number of additional random swaps per memory access can be used to adjust the parameter updating frequency. The higher the number of additional random swaps, the fewer memory accesses are needed to migrate all elements into $r_2$ permuted state. To determine the updating rate of the random parameter to balance the security and the performance for an implementation, embodiments consider the strength of the side-channel signal (e.g., how many samples attackers need to statistically differentiate two memory access locations) and the application memory access pattern (e.g., the distribution of the secure data accesses by the application). For example, if the attacker can statistically determine the accessed memory location using 100 samples, such an embodiment would update the parameter before there are 100 memory accesses. If the distribution is uniform, additional random swaps are not needed. However, if the distribution is not uniform, at least one additional random swap is implemented to ensure the parameter is updated within every 100 memory accesses.

Parameter-Based Permutation Function

An example embodiment utilizes the xor function ($\oplus$) as the parameter-based permutation function to move two data elements in the $r_1$ permuted state to the $r_2$ permuted state at a time while leaving other data elements untouched.

At the beginning of an epoch, the data units are in permuted state $r_1$. If an access requests for data unit $i_1$ comes up, an embodiment first identifies the location of $i_1$ in SMem using the equation $j_1=i_1\oplus r_1$. As it is requested now, it is time for $i_1$ to be updated to $r_2$ permuted state and relocated to $j_2=i_1\oplus r_2$. The data unit that stays in $j_2$ is still in $r_1$ state and its original index should satisfy $i_2\oplus r_1=j_2=i_1\oplus r_2$. By swapping the content at $j_1$ and $j_2$ in SMem, both data units $i_1$ and $i_2$ are moved to $r_2$ permuted state and located at $i_1\oplus r_2$ and $i_2\oplus r_2$, respectively. A proof that this swapping implements permuting without affecting other data units follows.

Given $r_1$, $r_2$ as random numbers with the same size (in bit length), $i_1$, $i_2$ as indices in the original data structure (d). $i_1$ and $i_2$ are located at $j_1=i_1\oplus r_1$ and $j_2=i_2\oplus r_1$ in SMem (D) respectively. That is $$D[i_1\oplus r_1]==d[i_1]$$

$$D[i_2\oplus r_1]==d[i_2]$$

With the swap operation, $i_1$ is moved to $j_2=i_1\oplus r_2$ and $i_2$ to $j_1=i_1\oplus r_1$. Therefore, $$i_1\oplus r_2==i_2\oplus r_1 \quad (1)$$

Xoring both sides of Equation 1 by ($r_1\oplus r_2$) yields $$i_1\oplus r_2\oplus(r_1\oplus r_2)==i_2\oplus r_1\oplus(r_1\oplus r_2) \quad (2)$$

$$i_1\oplus r_1==i_2\oplus r_2 \quad (3)$$

After the swap operation:

$$D[i_1\oplus r_1]==d[i_2]$$

$$D[i_2\oplus r_1]==D[i_1\oplus r_2]==d[i_1]$$

By Equation 3, we have $$D[i_1\oplus r_1]==D[i_2\oplus r_2]==d[i_2]$$

Security Analysis

In SMem, when a victim performs a load/store operation on a data element indexed by i, an adversary can observe the corresponding cache line (or bank), $line_j$, being accessed. However, if the data element is remapped to a new random cache line $line_k$, observing $line_k$ is statistically independent of observing $line_j$. $line_k$ can be any one of the cache lines with a uniform probability of 1/L, where L is the number of cache lines, guaranteed by balanced grouping implemented in embodiments. Thus, the adversary cannot associate the observed cache line $line_k$ with the data element.

Since embodiments use a parameter-based permutation function, the adversary can associate $line_k$ to the combination of the data element and the parameter value. Therefore, the frequency with which the parameter value is being changed is of importance. If the parameter value is changed for every memory access, the security of SMem is as strong as Path-ORAM proposed in the prior work [26] for defending against memory-based side-channel attacks. In Path-ORAM all data elements are shuffled for every data access even though most of the data elements are not used by every data access. This operation takes a O(log(N)) runtime, where N is the number of data elements. However, given the limited granularity of side-channel information observed by the adversary, embodiments can relax the security requirement to achieve better performance while maintaining the ability to defend against memory-based side-channel attacks. For example, when one cache line contains multiple data elements, access to any of the data elements in the cache line will let the adversary observe an access to the cache line, but the adversary cannot determine which data element. Thus, for memory-based side-channel attacks, the adversary requires multiple observations to statistically identify the accessed data element. For example, the most accurate implementation of Flush+Reload needs more than a few thousand observations to statistically identify accessed 16 T-table elements in AES.

As long as embodiments change data elements from one permuted state to the next one before the data elements can be statistically identified, embodiments are able to hide the access pattern from leaking through the side-channel. As shown in the empirical results, no data element is identifiable by all memory-based side-channel attacks that were evaluated when embodiments are applied.

Operations Analysis

Table 1, below, provides an overview of operations implemented by embodiments. For the initialization step, a memory space is allocated and original data is loaded to the allocated memory space. The data layout progressively migrates from one permuted state to the next permuted state upon every memory access, and this step incurs the major overhead. To locate a limb, embodiments implement two memory reads to the bitmap to determine the memory address for a limb. For every permuting/swap operation, embodiments implement three memory writes: two writes to update the data in SMem and one write to update the bitmap. For all limbs within the group to migrate to the new permuted state, a number of writes performed to update the bitmap is equal to half of the group size. The bitmap access complexity is O(1), and the data index i is protected, there is no information leakage when the bitmap is looked up.

TABLE 1

Operations in MemPoline

| User Actions | Operation Description | Calling Frequency | Memory Access |
|---|---|---|---|
| Initialization | 1. Allocate Memory | One Time | n Writes |
| | 2. Move data to SMem with initial permutation | | n Reads + n Writes |
| Memory Read/Write | 1. Locating element | Per access | 2 Reads |
| | 2. Permute | Per access | 3 Writes |
| | 3. Generate new random value | Per (group size)/2 accesses | (group size)/ 2 Writes |

Implementation—API

An embodiment is implemented by changing the source code of an application, e.g., the encryption method, for operating on data in SMem. An example embodiment, e.g., MemPoline, provides developers four simple APIs for initializing, loading, accessing (locating and swapping), and releasing SMem. First, developers can define and allocate SMem using mp init. Second, developers can copy the sensitive data structure to be protected, such as the AES SBox and the RSA multiplier lookup table, to the allocated memory space using mp save. Developers can locate data elements and perform swapping by using mp locate and swap. Finally, developers can release the allocated memory space using mp free. Below, a description of applying these APIs to AES and RSA to protect their respective sensitive data is provided, along with an evaluation of the security and performance impact of embodiments.

Source Code Transformation For AES

In an implementation, constructor and destructor are added to allocate and deallocate SMem using mp init and mp free, respectively. Because T-tables are of static type, the T-table data is copied to the SMem inside the constructor function call. Every T-table lookup operation is replaced by a mp locate and swap function call as shown in Listing 1.2, where Te0 is the original T-table, and STe0 is of type struct mp and contains all data in Te0. With the modified code, the assembly code size increases by 11.6%.

---

1 ~~Te0[(s0>>24)]~~
2 *mp locate and swap((s0 > > 24), STe0)

---

Listing 1.2: Transforming AES T-Table Look-Up Operation to Secure One

Source Code Transformation For RSA—Sliding Window Implementation

Unlike AES, the multiplier lookup table for RSA is dynamically created, so embodiments do not need to add constructor and destructor. Instead, the allocation and initialization are replaced with mp init, loading pre-computed multipliers with mp save, multipliers lookup operation with mp locate and swap, and deallocation with mp free as shown in Listing 1.3. With the modified code, the assembly code size only increases by 0.4%

---

Listing 1.3: Transforming RSA To Secure One

1 ~~mpi_ptr t b2i3[SIZE_B_2I3];~~
2 pdata *b2i3s = mp init(sizeof(mpi limb t)*n limbs, n elems);
3
4 ~~MPN_COPY (b_2i3[i], rp, rsize);~~
5 mp-save(i, rp, sizeof(mpi-limb-t)*rsize, b2i3s);
6
7 ~~base.u = b_2i3[e0 - 1];~~
8 base-u = mp locate and swap(e0 - 1, b2i3s);
9
10 ~~mpi_free_limb_space (b_2i3[i]);~~
11 mp free(b2i3s);

---

Evaluation

What follows is an evaluation of embodiments. The evaluation is based on applying embodiments to both AES, a symmetric cipher, and RSA, an asymmetric cipher. Both empirical results and theoretical analysis show that embodiments resist a series of existing memory-based side-channel attacks on CPUs and GPUs.

This section first describes a case study on AES with the countermeasure embodiments described herein applied. The security of the countermeasure is evaluated against a series of known memory-based side-channel timing attacks (Flush+Reload, Evict+Time, Cache Collision, L1 Cache Bank, Memory Coalescing Unit Attack, Shared Memory Attack). The attacks differ in the type (access-driven vs. time-driven), the observing granularity (cache line vs. cache bank), the platform (CPU vs. GPU), and also the distributions of timing observations. Applying the countermeasure to RSA is then considered and its performance impact is evaluated.

Experimental Setup

Embodiments apply generally against various attacks on different platforms and, as such, the evaluation was conducted by performing experiments on both CPUs and GPUs. The CPU system was a workstation computer equipped with an Intel i7 Sandy Bridge CPU, with three levels of caches, L1, L2, and L3 with sizes of 64 KB, 256 KB, 8 MB, respectively, and a DRAM of 16 GB. Hyperthreading technology was enabled. The standard cipher implementations of two crypto-libraries, namely AES of OpenSSL 1.0.2n and RSA of GnuPG-1.4.18 are evaluated. These two libraries have been actively used in prior work [10, 11, 22, 29].

The GPU platform was a server equipped with an Nvidia Kepler K40 GPU. The implementation utilized the standard CUDA porting of OpenSSL AES implementation as the one used in [12, 16].

Security Evaluation

The security of embodiments was tested by applying it to T-table based AES on both CPU and GPU platforms. Here, security refers to the side-channel resilience of embodiments, i.e., MemPoline, against various attacks, compared to the original unprotected ciphers. It is anticipated that embodiments address information leakage of different microarchitectural resources. Specifically, embodiments were evaluated for effectiveness against six memory-based side-channel attacks, targeting L1 cache line, L3 cache line, and L1 cache bank of CPUs, and memory coalescing and shared memory units on GPUs.

First, the Kolmogorov-Smirnov null-test [18] is used to quantify the side-channel information leakage that can be observed using attack techniques, from the evaluator point of view—assuming the correct key is known. Second, empirical security evaluation is performed by launching these attacks and analyzing with a large number of samples, from the attacker point of view, to retrieve the key and quantify the complexity of the attack.

Information Leakage Quantification

Leakage quantification is from the evaluator point of view where the operation is observed using attack techniques, and it is assumed that the correct key is known.

Memory-based side-channel attacks on AES monitor the access pattern to a portion (one cache line/bank) of T-tables during the last round. For the original implementation where the mapping of the T-table to memory address and cache is fixed, adversaries know what values the monitored cache line/bank contains. When adversaries detect an access by the victim to the monitored cache line/bank in the last round, the resulting ciphertext must have used the values, a set of $s_j$, in the monitored cache line/bank. With the ciphertext bytes $\{c_i|0 \le i \le 15\}$ known to the adversary, there is information leakage about the last round key, $\{rk_i|0 \le i \le 15\}$, with the relationship: $rk_i = c_i \oplus sbox[s_j]$.

Flush+Reload

Flush+Reload (F+R) is an access-driven attack, which consists of three steps. The state of the shared cache is first set by flushing one cache line from the cache. The victim, AES, then runs. At last the spy process reloads the flushed cache line and times it. A shorter reload time indicates AES has accessed the cache line. If there is information leakage in L3 cache line, the attack can correctly classify ciphertexts/samples as whether they have accessed the monitored cache line or not based on the observed reload timing. If these two timing distributions are distinguishable, the attack can observe the information leakage. The evaluation collected 100,000 samples and the results are shown in the plots 662a-b of FIGS. 6A-B, respectively. In FIGS. 6A-B the x-axes 660a and 660b indicate the observed reload timing in CPU cycles, and the y-axes 661a and 661b are the cumulative density function (CDF). For the original implementation shown in the plot 662a of FIG. 6A, the access 663a and non-access 664a distributions are visually distinguishable. However, for the secure implementation with an embodiment applied shown in the plot 662b, the access 663b and non-access 664b distributions are not distinguishable. This means there is no information leakage observed by Flush+Reload attack when embodiments are applied.

The distinguishability between two distributions can be measured by the Kolmogorov-Smirnov (KS) null-test [18]. If the null hypothesis test result, p-value, is less than a significant level (e.g., 0.05), the distributions are distinguishable. Using the stats package in Python, the p-value for both non-secure 662a and secure 662b implementations against a F+R attack was determined to be 0 and 0.27, respectively, indicating there is no leakage of the secure implementation 662b.

The effectiveness of embodiments against the rest of known memory-based side-channel timing attacks has also been analyzed and the KS null test has also been used in these evaluations. In such testing, the p-values for non-secure implementations are all close to zero (lower than the significant level) while the p-values for secure implementations are larger than the significant level. The results demonstrate that embodiments, e.g., MemPoline, successfully obfuscate memory accesses without information leakage.

Empirical Attacks

Empirical attacks are from the attacker point of view. To empirically test embodiments attacks were launched and analyzed with a large number of samples.

To evaluate embodiments, attacks were performed to recover the key. Given the result of leakage quantification, it was anticipated that these attacks would not recover the key from the secure implementations, while the original implementations would be vulnerable.

Figure 7B:
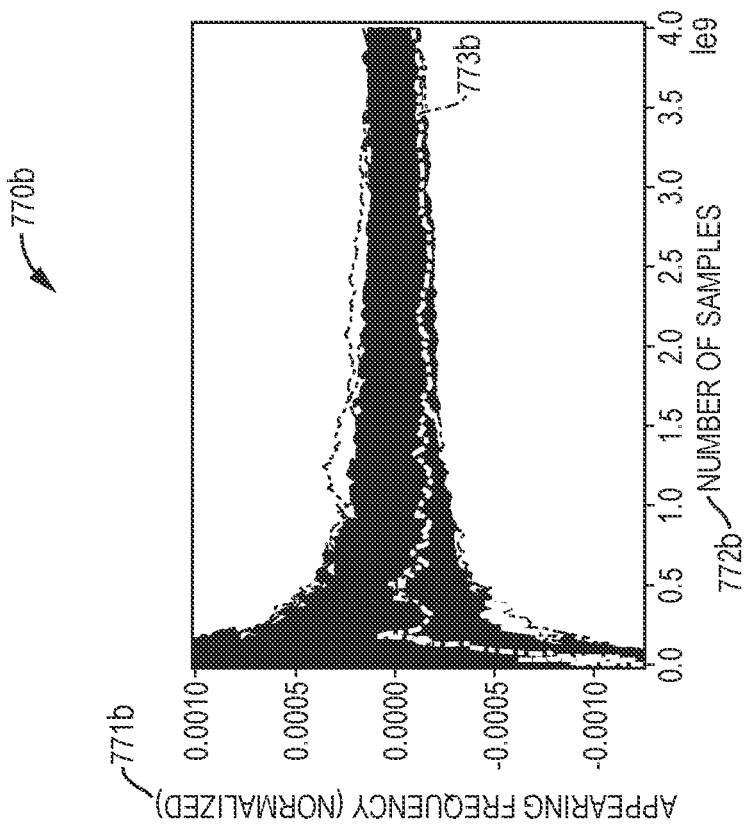
FIG. 7B is a plot depicting appearing frequency versus samples for an encryption methodology protected by an embodiment.
Figure 7A:
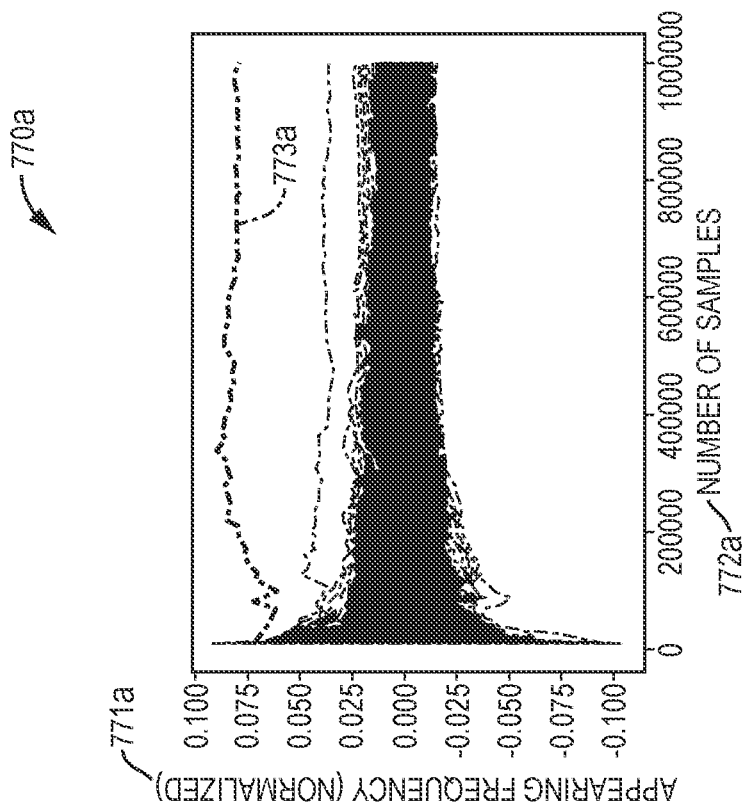
FIG. 7A is a plot depicting appearing frequency versus samples for an unprotected encryption methodology.

For all the attacks on the secure implementations, the key could not be recovered even with 4 billion samples (about 256 GB data of timing and ciphertexts). Attack failure with these many samples demonstrates that implementations with the countermeasures on are secure. For the F+R attack on the original non-secure implementation, the key can reliably be recovered using less than 10,000 samples. This is shown in plot 770a of FIG. 7A where the normalized appearing frequency 771a is plotted versus the number of samples 772a. In the plot 770a the appearing frequency 771a of each possible key value is the distinguisher, where one value (shown by the dark line 773a in the plot 770a for the correct key) out of 256 is the outlier. For comparison across attack trials that use a different number of samples, the appearing frequency of each key value is normalized based on its mean value. The plot 770b of FIG. 7B, where the normalized appearing frequency 771b is plotted versus the number of samples 772b and the correct key value is indicated by the line 773b, shows that the attack does not work even with 4 billion samples on the secure implementation. This is the same situation for other attacks.

Application to Other Methods

Embodiments have also been evaluated using a patched sliding-window implementation of the RSA method against F+R attack. For the purpose of security evaluation (rather than attack), the dynamically allocated memory used by the multipliers is shared with the adversary and the F+R technique is used to monitor the usage of one multiplier (Multiplier 1).

This testing used a similar victim model as presented in the prior work [22, 30]. The evaluation included repeatedly running the RSA decryption of a message encrypted with a 3,072 bit ElGamal public key. The attack records the reload time of the monitored multiplier and the actual multiplier (calculated from the method) accessed by every multiplication operation. If the attack can observe any leakage, the attack should be able to differentiate samples that access the monitored multiplier (one distribution) from ones that do not (the other distribution) based on the observed reload time. The KS null-test [18] was used to verify the leakage. The p-values for the original implementation and the secure implementation are 0 and 0.77, respectively. This indicates the two timing distributions are indistinguishable when the countermeasure is applied.

Performance Evaluation

Embodiments are at the software level and involve an initialization and run-time shuffling, incurring performance degradation. However, unlike other software-based countermeasures [17, 24, 31], which affect the performance system-wide, the impact of embodiments is limited to the patched application. The computation overhead strongly depends on the memory access pattern of the program.

The source of runtime overhead is the mp locate and swap function call. This function contains two actions: permuting limbs and generating new random values. Table 2 gives a summary of how frequent these two actions are performed in AES and RSA. The calling frequency is determined by the number of algorithmic access requests to the sensitive data (T-table for AES and multipliers for RSA), which translates to additional execution time.

TABLE 2

Summary Of Operations Performed For AES And RSA

| | Algorithmic Memory Accesses | Permuting | Generating Random Value |
|---|---|---|---|
| RSA (1 Decryption) | 6048 | 8754 | 265 |
| AES (100 Encryptions) (per T-table) | 4000 | 4000 | 456 |

Function Runtime

An evaluation included repeatedly running the mp locate and swap function call with a random input and the function takes 669 CPU cycles on average. Locating the limb action takes 22 CPU cycles, and generating a new random value action takes 78 CPU cycles. The permuting action consists of two operations: swap and random permute. The swap operation takes 22 cycles, and the random permute operation takes 567 cycles. Considering the Amdahl's law with other computation (without data access) and cache hits, the overall slowdown of the program can be much less significant.

AES Runtime

The runtime overhead for AES has been measured by encrypting one 16 M file 10,000 times. Note that a larger file size is used because AES is so much faster than RSA in encryption. The mean execution time for the original code is 0.132 seconds and for the patched code is 1.584 seconds. This is a 12× performance slowdown.

RSA Runtime

RSA method consists of fewer memory accesses, but heavy logical computations. To evaluate RSA, the RSA decryption of a single 1K file was run 10,000 times. The mean execution time for the original code is 0.0190 seconds and for the patched code is 0.0197 seconds, which is only a 4% performance degradation. The sliding-window implementation of the RSA method has an insignificant number of accesses to the protected memory in comparison to other computations.

In AES, memory accesses to the sensitive data are a major portion of the functionality. Any additional operation depending on such inherent memory accesses will introduce a significant amount of penalty, especially when the T-table implementation of AES is very efficient.

Comparison to Other Works

The performance of embodiments is significantly better than any other ORAM-based countermeasures. In [23], the countermeasure, which used a hardware implementation of ORAM, imposes 14.7× performance overhead. Raccoon [25] is a software-level countermeasure that adopts the software implementation of ORAM for storing the data. In some of Raccoon's benchmark, it experiences more than 100× overhead just due to the impact of ORAM operations. For example, Histogram program shows 144× slowdown when it runs on 1K input data elements. In applying embodiments, e.g., method 440, to the same Histogram program only a 1.4% slowdown is observed.

Any application with secret-dependent memory accesses can be vulnerable to memory-based side-channel attacks. Using ORAM schemes can completely hide the memory access footprint as shown in the software ORAM-based countermeasure [25]. However, there can be more than 100× performance overhead due to ORAM related operations.

Embodiments provide just-in-need security for defending against memory-based side-channel attacks with a significantly better performance than other ORAM-based countermeasures. Embodiments' countermeasure progressively shuffles data within a memory region and randomizes the secret-dependent data memory access footprint. Embodiments have been applied to AES and RSA algorithms on both CPUs and GPUs. Both empirical and theoretical results show no information leakage when embodiments are enabled under all known memory-based side-channel attacks. Results show a 12× performance slowdown in AES and 4% performance slowdown in RSA.

Embodiments provide a software countermeasure against memory-based side-channel attacks with much less performance degradation than the prior work [25, 26]. Embodiments shuffle data through use of an efficient permutation scheme to provide just-in-need security level to defend against memory-based side-channel attacks. Specifically, embodiments use a parameter-directed permutation function to shuffle the memory space progressively. According to an embodiment, only the parameter value (instead of a position map) needs to be kept private to track the real dynamic locations of data. Thus, in an embodiment, the memory access runtime is $O(1)$, significantly lower than $O(\log(N))$ of PathORAM [26] and $O(N)$ of Raccoon [25].

Both the computation complexity and storage complexity of the data shuffling method of embodiments are much lower than prior randomization methods, providing great efficiency. Embodiments are algorithm-agnostic and are applicable to many different cryptographic software implementations. Embodiments significantly improve the security of common crypto libraries that are widely used on desktops, mobile systems, and cloud systems. Embodiments work against many known side-channel attacks, targeting different microarchitectures on different platforms. Embodiments provide effective and secure protection, verified both theoretically and empirically. An example embodiment devises a parameter-directed permutation method instead of the prior pure randomization method, which can achieve the same security level while incurring much lower computation and storage overhead.

Embodiments can be used by online conference software, such as Zoom®, WebEx®, and Microsoft Teams®, for the secure implementation of their encryption algorithms (typically AES and RSA) that are used to encrypt the data traffic. Embodiments can also be used by cloud services to protect privacy of sensitive applications and data. The embodiments can be used in massive Internet-of-Things (IoT) devices and systems for secure communications. Embodiments can also be used to implement a management and security engine for online conference software. Further, embodiments can be used for the encryption for data-in-transit and data-at-rest and to secure communications for autonomous driving.

Figure 8:
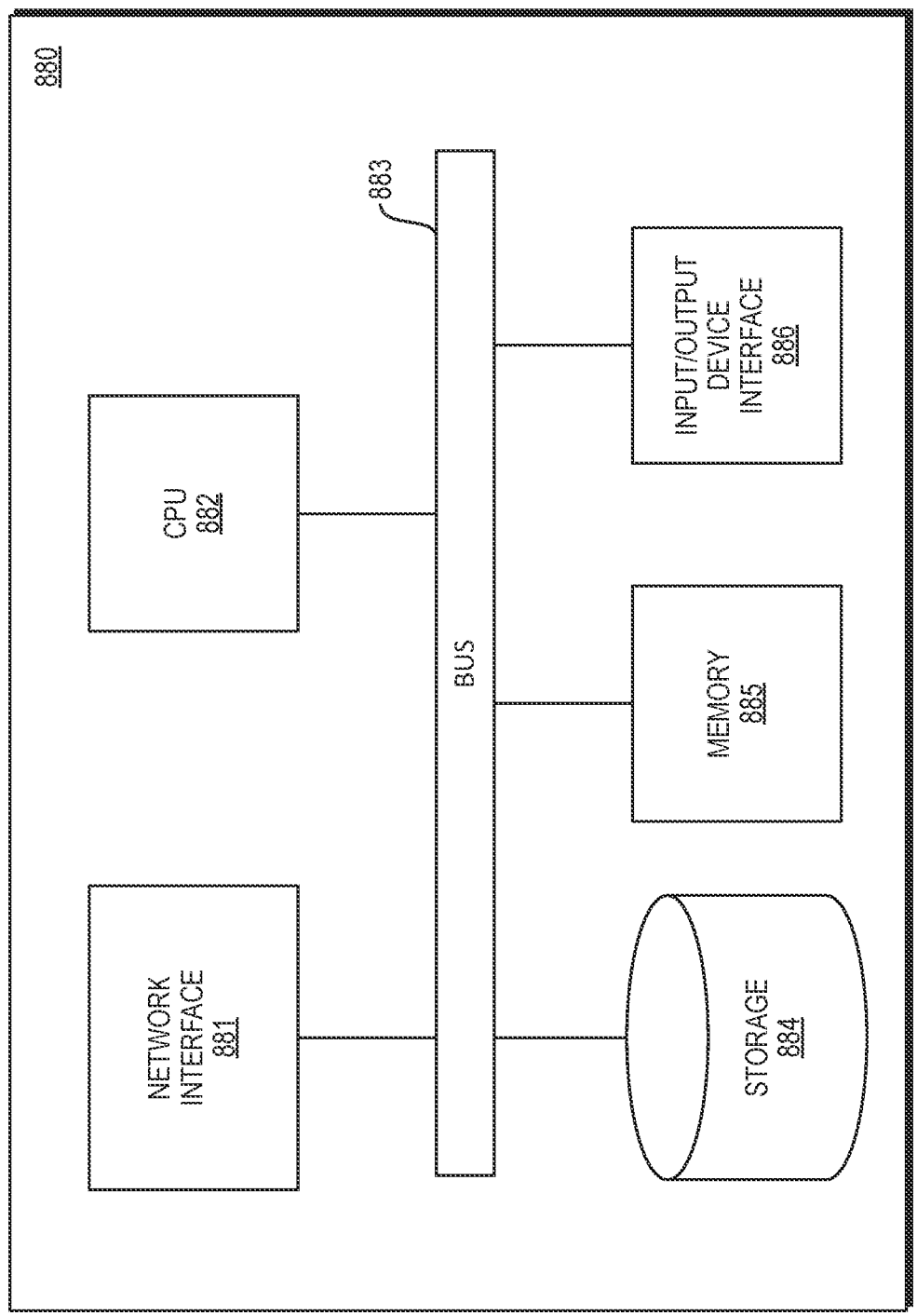
FIG. 8 is a simplified block diagram of a computer system embodiment for protecting against memory-based side-channel attacks.

FIG. 8 is a simplified block diagram of a computer-based system 880 that may be used to implement any variety of the embodiments of the present invention described herein. The system 880 comprises a bus 883. The bus 883 serves as an interconnect between the various components of the system 880. Connected to the bus 883 is an input/output device interface 886 for connecting various input and output devices such as a keyboard, mouse, display, speakers, etc. to the system 880. A central processing unit (CPU) 882 is connected to the bus 883 and provides for the execution of computer instructions implementing embodiments. Memory 885 provides volatile storage for data used for carrying out computer instructions implementing embodiments described herein, such as those embodiments previously described hereinabove. Storage 884 provides non-volatile storage for software instructions, such as an operating system (not shown) and embodiment configurations, etc. The system 880 also comprises a network interface 881 for connecting to any variety of networks known in the art, including wide area networks (WANs) and local area networks (LANs).

It should be understood that the example embodiments described herein may be implemented in many different ways. In some instances, the various methods and systems described herein may each be implemented by a physical, virtual, or hybrid general purpose computer, such as the computer system 880, or a computer network environment such as the computer environment 990, described herein below in relation to FIG. 9. The computer system 880 may be transformed into the systems that execute the methods described herein, for example, by loading software instructions into either memory 885 or non-volatile storage 884 for execution by the CPU 882. One of ordinary skill in the art should further understand that the system 880 and its various components may be configured to carry out any embodiments or combination of embodiments of the present invention described herein. Further, the system 880 may implement the various embodiments described herein utilizing any combination of hardware, software, and firmware modules operatively coupled, internally, or externally, to the system 880.

Figure 9:
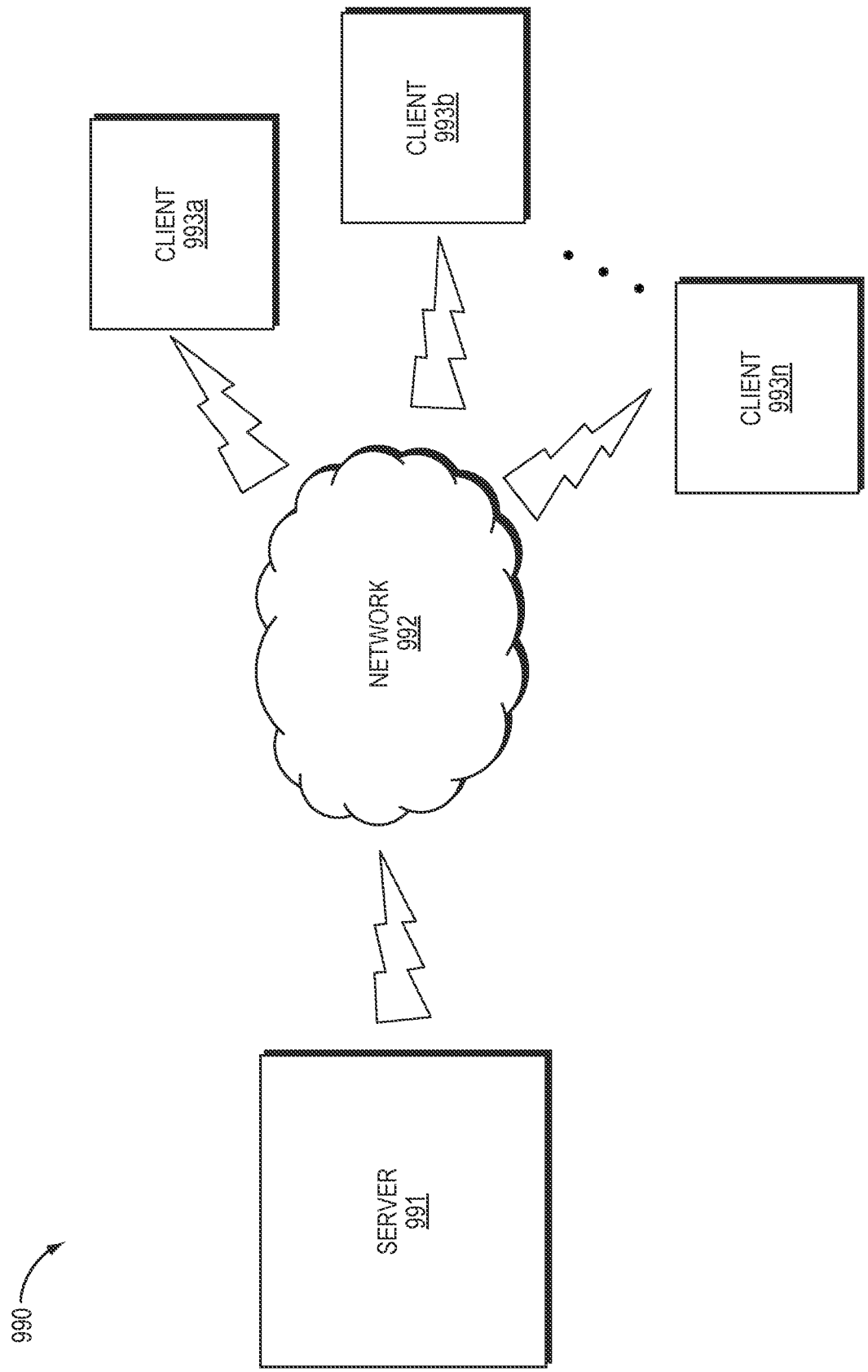
FIG. 9 is a simplified diagram of a computer network environment in which an embodiment of the present invention may be implemented.

FIG. 9 illustrates a computer network environment 990 in which an embodiment of the present invention may be implemented. In the computer network environment 990, the server 991 is linked through the communications network 992 to the clients 993*a-n*. The environment 990 may be used to allow the clients 993*a-n*, alone or in combination with the server 991, to execute any of the embodiments described herein. For non-limiting example, computer network environment 990 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[1] Biham, E.: A fast new des implementation in software. In: Int. Wksp. On Fast Software Encryption. pp. 260-272 (1997).

[2] Bonneau, J., Mironov, I.: Cache-collision timing attacks against aes. In: CHES. pp. 201-215 (2006).

[3] Chen, S., Liu, F., Mi, Z., Zhang, Y., Lee, R. B., Chen, H., Wang, X.: Leveraging hardware transactional memory for cache side-channel defenses. In: Asian CCS. pp. 601-608 (2018).

[4] Domnitser, L., Jaleel, A., Loew, J., Abu-Ghazaleh, N., Ponomarev, D.: Nonmonopolizable caches: Low-complexity mitigation of cache side channel attacks. ACM TACO 8(4), 35 (2012).

[5] Goldreich, O., Ostrovsky, R.: Software protection and simulation on oblivious rams. J. ACM 43(3), 431-473 (1996).

[6] Gruss, D., Lettner, J., Schuster, F., Ohrimenko, O., Haller, I., Costa, M.: Strong and efficient cache side-channel protection using hardware transactional memory. In: USENIX Security Symp. (2017).

[7] Gruss, D., Maurice, C., Wagner, K., Mangard, S.: Flush+flush: a fast and stealthy cache attack. In: Int. Conf. on Detection of Intrusions and Malware, and Vulnerability Assessment. pp. 279-299 (2016).

[8] Giilmezoglu, B., Inci, M. S., Irazoqui, G., Eisenbarth, T., Sunar, B.: A faster and more realistic flush+reload attack on aes. In: Int. Wksp. on Constructive Side-Channel Analysis Secure Design. pp. 111-126 (2015).

[9] Giilmezoglu, B., inci, M. S., Irazoqui, G., Eisenbarth, T., Sunar, B.: A faster and more realistic flush+reload attack on aes. In: Constructive Side-Channel Analysis Secure Design. pp. 111-126 (2015).

[10] Irazoqui, G, Eisenbarth, T., Sunar, B.: S $ a: A shared cache attack that works across cores and defies vm sandboxing—and its application to aes. In: S&P, IEEE Symp. pp. 591-604 (2015).

[11] Irazoqui, G., Inci, M. S., Eisenbarth, T., Sunar, B.: Wait a minute! a fast, cross-vm attack on aes. In: Int. Wksp. on Recent Advances in Intrusion Detection. pp. 299-319 (2014).

[12] Jiang, Z. H., Fei, Y., Kaeli, D.: A complete key recovery timing attack on a gpu. In: HPCA, IEEE Symp. (2016).

[13] Jiang, Z. H., Fei, Y., Kaeli, D. R.: A novel side-channel timing attack on gpus. In: GLVLSI, ACM Symp. pp. 167-172 (2017).

[14] Jiang, Z. H., Fei, Y.: A novel cache bank timing attack. In: Proc. ICCAD. pp. 139-146 (2017).

[15] Kadam, G., Zhang, D., Jog, A.: Rcoal: mitigating gpu timing attack via subwarp-based randomized coalescing techniques. In: HPCA, IEEE Symp. pp. 156-167 (2018).

[16] Karimi, E., Jiang, Z. H., Fei, Y., Kaeli, D.: A timing side-channel attack on a mobile gpu. In: ICCD, IEEE Conf. pp. 67-74 (2018).

[17] Kim, T., Peinado, M., Mainar-Ruiz, G.: Stealthmem: System-level protection against cache-based side channel attacks in the cloud. In: USENIX Security Symp. pp. 189-204 (2012).

[18] Kolmogorov, A.: Sulla determinazione empirica di una lgge di distribuzione.Inst. Ital. Attuari, Giorn. 4, 83-91 (1933).

[19] Liu, F., Ge, Q., Yarom, Y., Mckeen, F., Rozas, C., Heiser, G., Lee, R. B.: Catalyst: Defeating last-level cache side channel attacks in cloud computing. In: HPCA, IEEE Symp. pp. 406-418 (2016).

[20] Liu, F., Lee, R. B.: Random fill cache architecture. In: MICRO, IEEE/ACM Int. Symp. pp. 203-215 (2014).

[21] Liu, F., Wu, H., Mai, K., Lee, R. B.: Newcache: Secure cache architecture thwarting cache side-channel attacks. IEEE Micro 36(5), 8-16 (2016).

[22] Liu, F., Yarom, Y., Ge, Q., Heiser, G., Lee, R. B.: Last-level cache sidechannel attacks are practical. In: S&P, IEEE Symp. (2015).

[23] Maas, M., Love, E., Stefanov, E., Tiwari, M., Shi, E., Asanovic, K., Kubiatowicz, J., Song, D.: Phantom: Practical oblivious computation in a secure processor. In: CCS, ACM Conf. pp. 311-324 (2013).

[24] Raj, H., Nathuji, R., Singh, A., England, P.: Resource management for isolation enhanced cloud services. In: Proc. of the ACM wksp on Cloud computing security. pp. 77-84 (2009).

[25] Rane, A., Lin, C., Tiwari, M.: Raccoon: Closing digital side-channels through obfuscated execution. In: USENIX Security Symp. pp. 431-446 (2015).

[26] Stefanov, E., Van Dijk, M., Shi, E., Fletcher, C., Ren, L., Yu, X., Devadas, S.: Path oram: an extremely simple oblivious ram protocol. In: CCS, ACM Conf. pp. 299-310 (2013).

[27] Tromer, E., Osvik, D. A., Shamir, A.: Efficient cache attacks on aes, and countermeasures. J. of Cryptology 23(1), 37-71 (2010).

[28] Wang, Z., Lee, R. B.: New cache designs for thwarting software cache-based side channel attacks. ACM SIGARCH Computer Architecture News 35(2), 494-505 (2007).

[29] Yarom, Y., Falkner, K.: Flush+reload: a high resolution, low noise, 13 cache side-channel attack. In: USENIX Security Symp. pp. 719-732 (2014).

[30] Yarom, Y., Genkin, D., Heninger, N.: Cachebleed: A timing attack on OpenSSL constant time RSA. In: Crypt. Hardware & Embedded Systems (August 2016).

[31] Zhou, Z., Reiter, M. K., Zhang, Y.: A software approach to defeating side channels in last-level caches. In: CCS, ACM Conf. pp. 871-882 (2016).

What is claimed is:

1. A method of protecting against memory-based side-channel attacks, the method comprising:
in response to a data access request by an encryption methodology regarding a first data element from amongst a plurality of data elements stored in memory:
determining a storage address of a second data element of the plurality using (i) an address of the first data element in the memory, (ii) a permutation function, and (iii) a random number;
storing the first data element at the determined storage address of the second data element and storing the second data element at the address of the first data element, thereby protecting the encryption methodology from memory-based side-channel attacks; and
tracking update status for each of the plurality of data elements by creating a bit-map wherein each of the plurality of data elements has an associated one-bit indicator of permutation status.

2. The method of claim 1, further comprising, in response to the request:
servicing the request by providing the first data element to the encryption methodology.

3. The method of claim 1 wherein the permutation function is an exclusive or (XOR) function.

4. The method of claim 1,
wherein update status is associated with storage addresses of the plurality of data elements.

5. The method of claim 1 wherein the random number is a second random number and the method further comprises:
prior to receipt of the request, storing each of the plurality of data elements at random locations in the memory, wherein each random location is a function of a first random number.

6. The method of claim 5 further comprising:
specifying a region in the memory, wherein the random locations are in the specified region in the memory.

7. The method of claim 1 further comprising:
iterating the determining and storing for each of a plurality of requests; and
in at least one given iteration, modifying the random number.

8. The method of claim 7 further comprising:
selecting the at least one given iteration, in which to modify the random number, as a function of the encryption methodology.

9. The method of claim 1 further comprising:
storing each of the plurality of data elements at addresses determined using (i) the data elements address, (ii) the permutation function, and (iii) the random number; and
updating the random number.

10. The method of claim 9 wherein the storing of each of the plurality of data elements and the updating the random number is performed in accordance with an epoch length, where epoch length is in terms of a number of requests to access the plurality of data elements.

11. The method of claim 1 further comprising:
specifying a safe region in the memory; and
loading each of the plurality of data elements to addresses in the specified region, wherein the addresses are a function of an initial random number.

12. The method of claim 1 wherein the random number is a first random number and each of the plurality of data elements is stored at an address that is a function of the first random number or a second random number.

13. The method of claim 12 wherein size and range of the first random number and second random number is determined by a platform microarchitecture, cache structure, and function of the encryption methodology.

14. A computer system for protecting against memory-based side-channel attacks, the system comprising:
a processor; and
a memory with computer code instructions stored thereon, the processor and the memory, with the computer code instructions, being configured to cause the system to:
in response to a data access request by an encryption methodology regarding a first data element from amongst a plurality of data elements stored in memory:
determine a storage address of a second data element of the plurality using (i) an address of the first data element in the memory, (ii) a permutation function, and (iii) a random number;

store the first data element at the determined storage address of the second data element and store the second data element at the address of the first data element, thereby protecting the encryption methodology from memory-based side-channel attacks; and track update status for each of the plurality of data elements by creating a bit-map wherein each of the plurality of data elements has an associated one-bit indicator of permutation status.

15. The system of claim 14 wherein update status is associated with storage addresses of the plurality of data elements.

16. The system of claim 14 wherein the processor and the memory, with the computer code instructions, are further configured to cause the system to:

iterate the determining and storing for each of a plurality of requests; and in at least one given iteration, modify the random number.

17. The system of claim 14 wherein the processor and the memory, with the computer code instructions, are further configured to cause the system to:

specify a safe region in the memory; and load each of the plurality of data elements to addresses in the specified region, wherein the addresses are a function of an initial random number.

18. The system of claim 14 wherein the permutation function is an exclusive or (XOR) function.

19. A computer program product for protecting against memory-based side-channel attacks, the computer program product comprising:

one or more non-transitory computer-readable storage devices and program instructions stored on at least one of the one or more storage devices, the program instructions, when loaded and executed by a processor, cause an apparatus associated with the processor to:

in response to a data access request by an encryption methodology regarding a first data element from amongst a plurality of data elements stored in memory:

determine a storage address of a second data element of the plurality using (i) an address of the first data element in the memory, (ii) a permutation function, and (iii) a random number;

store the first data element at the determined storage address of the second data element and store the second data element at the address of the first data element, thereby protecting the encryption methodology from memory-based side-channel attacks; and update status for each of the plurality of data elements by creating a bit-map wherein each of the plurality of data elements has an associated one-bit indicator of permutation status.

* * * * *